(12) United States Patent
Bae et al.

(10) Patent No.: US 10,837,659 B2
(45) Date of Patent: Nov. 17, 2020

(54) AIR PURIFIER

(71) Applicant: COWAY CO., LTD., Chungcheongnam-do (KR)

(72) Inventors: Jun-Hyoung Bae, Seoul (KR); Sang-Woo Kang, Seoul (KR); In-Kyu Back, Seoul (KR)

(73) Assignee: COWAY CO., LTD., Chungcheongnam-do (KR)

( * ) Notice: Subject to any disclaimer, the term of this patent is extended or adjusted under 35 U.S.C. 154(b) by 258 days.

(21) Appl. No.: 15/776,882

(22) PCT Filed: Sep. 30, 2016

(86) PCT No.: PCT/KR2016/011011
§ 371 (c)(1),
(2) Date: May 17, 2018

(87) PCT Pub. No.: WO2017/095007
PCT Pub. Date: Jun. 8, 2017

(65) Prior Publication Data
US 2018/0328605 A1    Nov. 15, 2018

(30) Foreign Application Priority Data

Dec. 2, 2015  (KR) .................. 10-2015-0170672
Dec. 4, 2015  (KR) .................. 10-2015-0172527

(51) Int. Cl.
*B01D 46/42*   (2006.01)
*F24F 3/16*    (2006.01)
(Continued)

(52) U.S. Cl.
CPC ............ *F24F 3/1603* (2013.01); *B01D 46/42* (2013.01); *F24F 1/0071* (2019.02); *F24F 3/14* (2013.01);
(Continued)

(58) Field of Classification Search
CPC . B01D 46/42; F24F 3/1603; F24F 3/16; F24F 13/06; F24F 1/0071; F24F 13/20;
(Continued)

(56) References Cited

U.S. PATENT DOCUMENTS 4,192,461 A   3/1980  Arhorg
5,330,722 A   7/1994  Pick et al.
(Continued)

FOREIGN PATENT DOCUMENTS

CN   201739198   2/2011
EP   2602563    6/2013
(Continued)

OTHER PUBLICATIONS

International Search Report for PCT/KR2016/011011 dated Dec. 16, 2016, 4 pages.

*Primary Examiner* — Minh Chau T Pham
(74) *Attorney, Agent, or Firm* — Dority & Manning, P.A.

(57) ABSTRACT

Disclosed is an air purifier which can secure a high air volume and a rapid flow velocity of discharged air, and also can achieve aesthetic improvement in design. The air purifier according to an embodiment of the present invention includes a housing; a blower fan which is provided inside the housing; and an annular discharge flow path which configures a path through which air inside the housing which flows by the blower fan is discharged to the outside, is formed inside the housing while having an annular discharge end, and a cross-section which becomes narrower from the inside of the housing towards the discharge end.

20 Claims, 43 Drawing Sheets

(51) Int. Cl.

| | | |
|---|---|---|
| *F24F 3/06* | (2006.01) | |
| *F24F 1/0071* | (2019.01) | |
| *F24F 13/20* | (2006.01) | |
| *F24F 13/28* | (2006.01) | |
| *F24F 13/14* | (2006.01) | |
| *F04D 25/08* | (2006.01) | |
| *F04F 5/16* | (2006.01) | |
| *F24F 13/06* | (2006.01) | |
| *F24F 3/14* | (2006.01) | |

(52) U.S. Cl.
CPC ............... *F24F 3/16* (2013.01); *F24F 13/06* (2013.01); *F24F 13/20* (2013.01); *F24F 13/28* (2013.01); *F24F 2003/1614* (2013.01); *F24F 2013/0612* (2013.01); *F24F 2013/205* (2013.01); *F24F 2013/207* (2013.01); *F24F 2221/26* (2013.01); *F24F 2221/38* (2013.01)

(58) Field of Classification Search
CPC ...... F24F 13/28; F24F 3/14; F24F 2013/0612; F24F 2003/1614; F24F 2013/205; F24F 2013/207; F24F 2221/26; F24F 2221/38; F24F 2013/1614; F04D 25/08; F04F 5/16
USPC .............................. 55/467, 471–473; 454/284
See application file for complete search history.

(56) References Cited

U.S. PATENT DOCUMENTS

| | | | |
|---|---|---|---|
| 2009/0139408 A1 | 6/2009 | Kang | |
| 2010/0226797 A1 | 9/2010 | Fitton et al. | |
| 2012/0114513 A1 | 5/2012 | Simmonds et al. | |
| 2013/0028763 A1 | 1/2013 | Staniforth et al. | |
| 2013/0280051 A1 | 10/2013 | Nicolas et al. | |
| 2014/0084492 A1 | 3/2014 | Staniforth et al. | |
| 2014/0210114 A1* | 7/2014 | Staniforth | F04D 25/08 261/30 |
| 2015/0093098 A1 | 4/2015 | Fitton et al. | |
| 2016/0187024 A1* | 6/2016 | Mun | F04D 25/166 454/284 |
| 2016/0236541 A1* | 8/2016 | Gruenbeck | F24F 13/06 |
| 2017/0248339 A1* | 8/2017 | Mun | B01D 46/0047 |
| 2018/0064840 A1* | 3/2018 | Saiki | F24F 3/16 |
| 2018/0080676 A1* | 3/2018 | Cho | F24F 1/0014 |
| 2018/0093216 A1* | 4/2018 | Kang | B01D 46/0039 |

FOREIGN PATENT DOCUMENTS

| | | |
|---|---|---|
| FR | 2369427 | 5/1978 |
| JP | S61110899 | 7/1986 |
| JP | 2010203441 | 9/2010 |
| JP | 2012506515 | 3/2012 |
| JP | 2013029108 | 2/2013 |
| KR | 20050046082 | 5/2005 |
| KR | 0601218 | 7/2006 |
| KR | 20090058446 | 6/2009 |
| KR | 1240536 | 3/2013 |
| WO | WO2011143924 | 11/2011 |

* cited by examiner

[FIG.1]
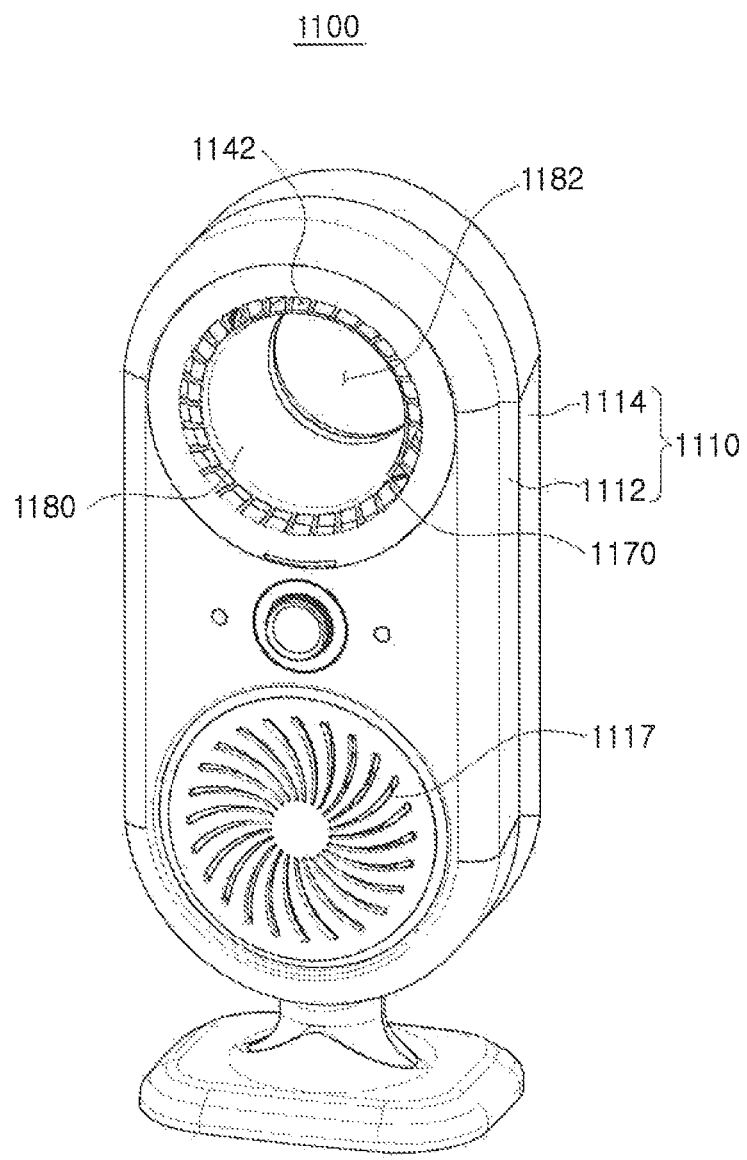

[FIG.2]
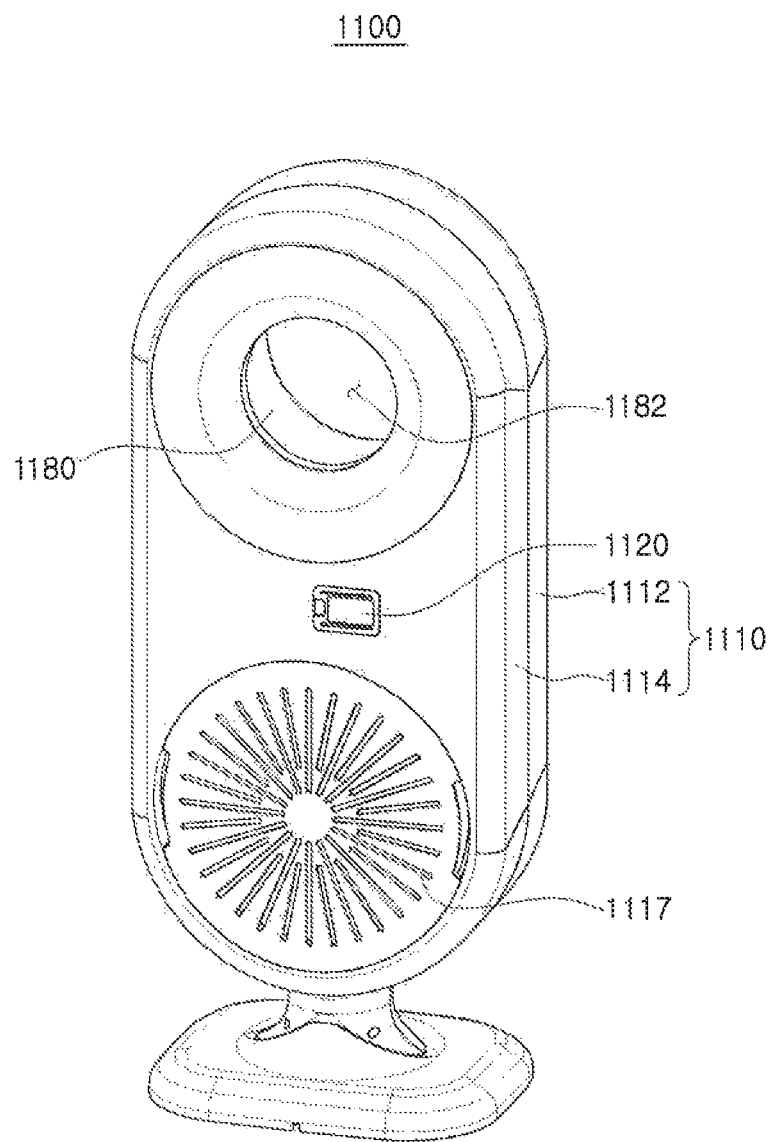

[FIG.3]
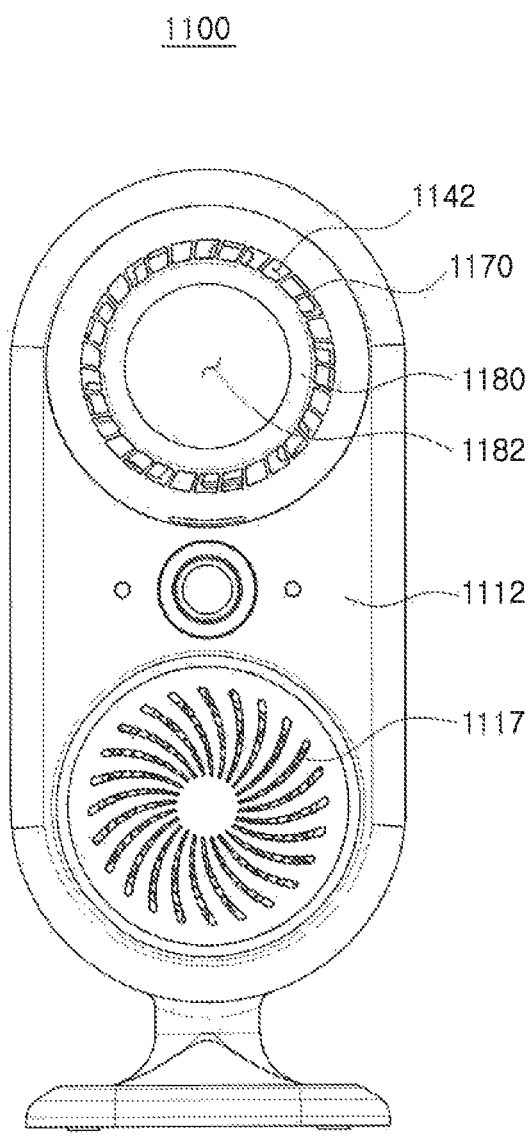

[FIG.4]
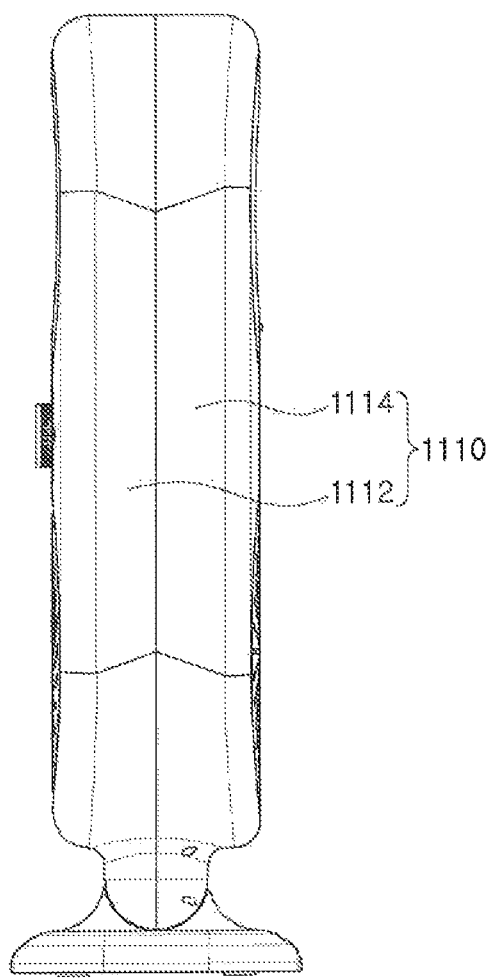

[FIG.5]
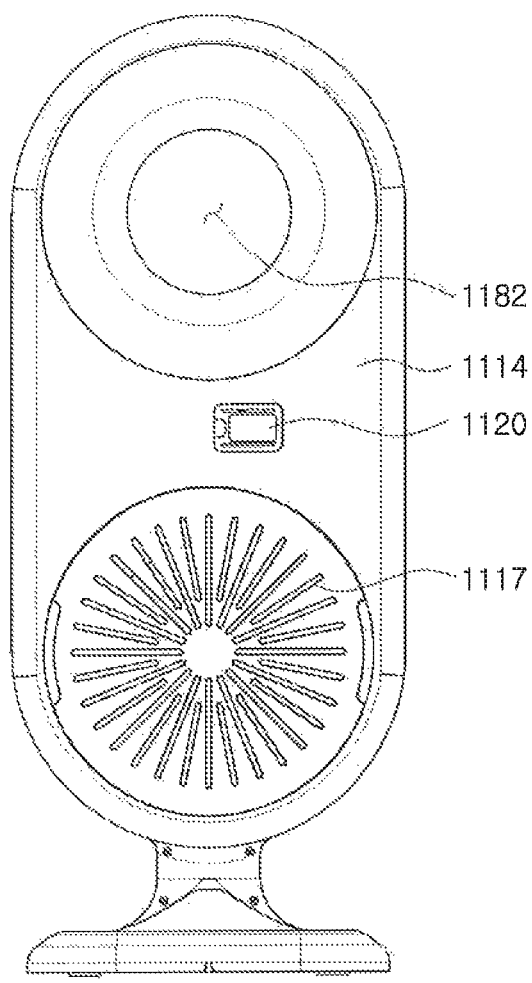

[FIG.6]
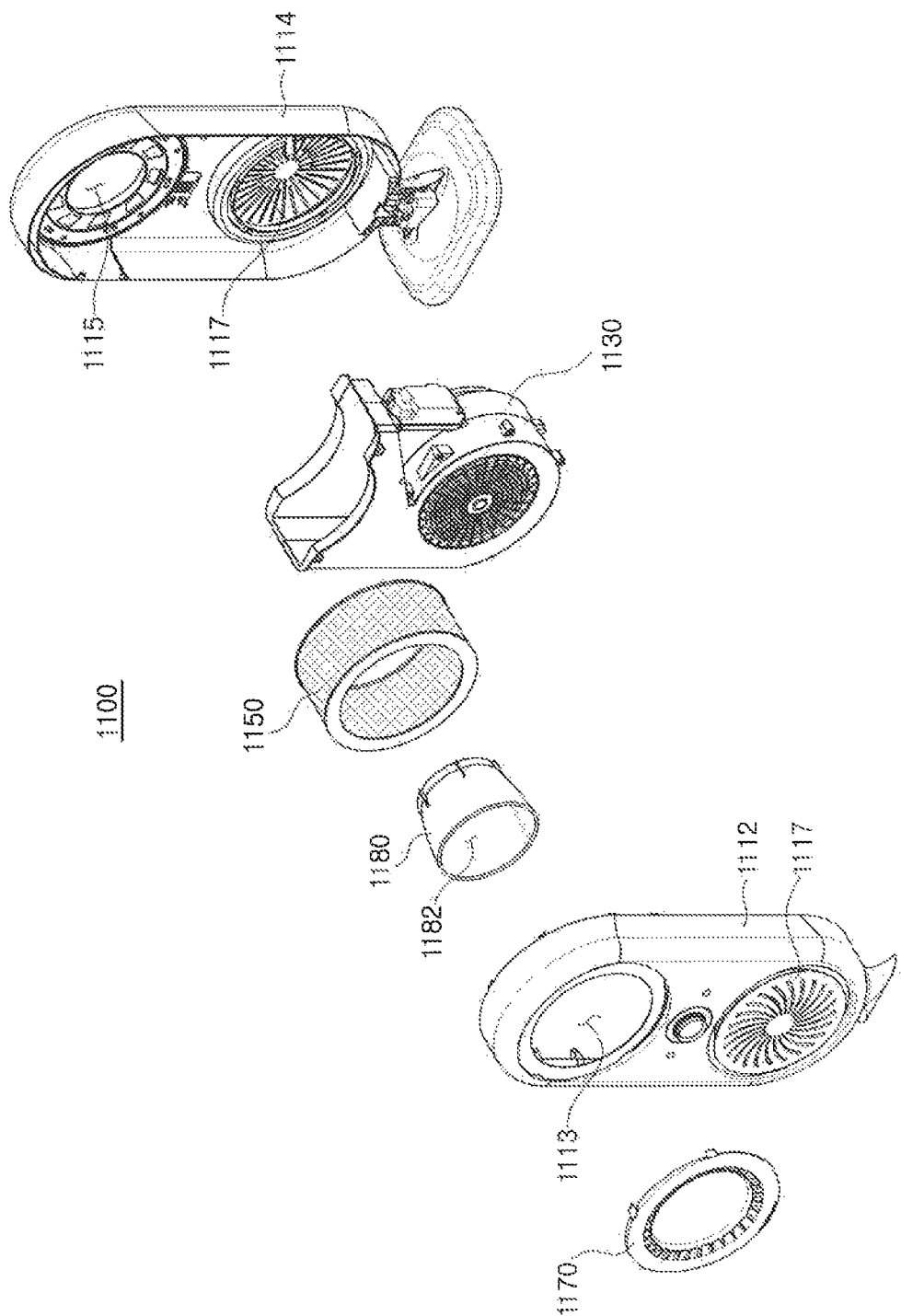

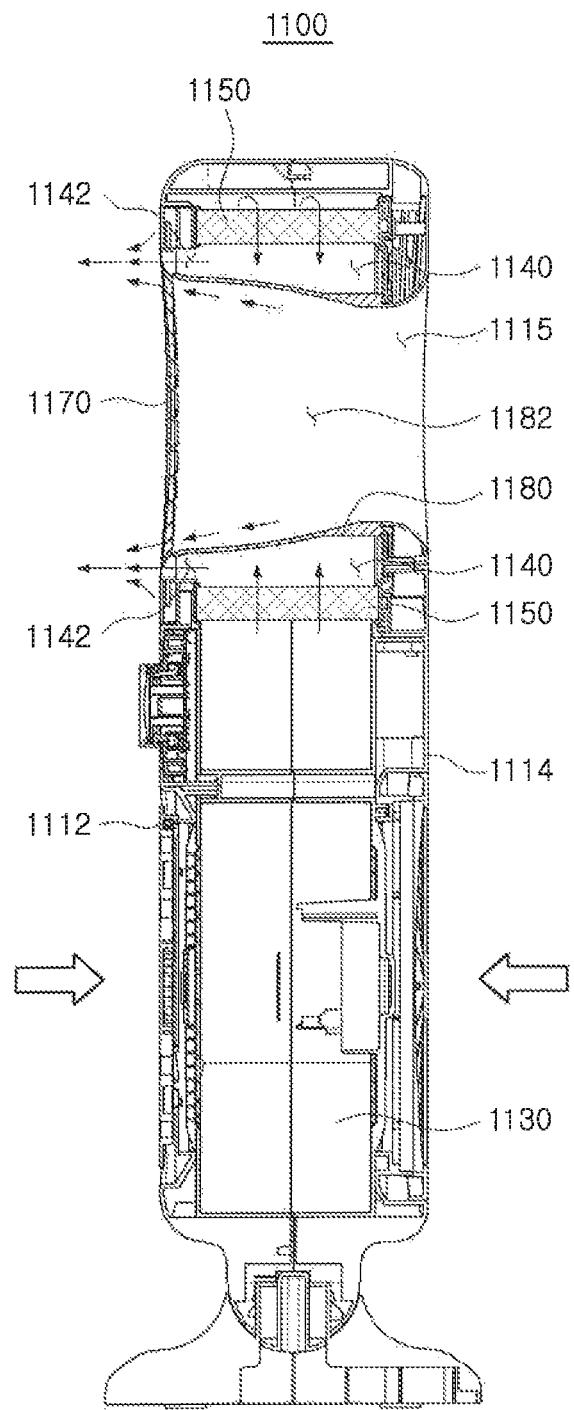
[FIG.7]

[FIG.8]
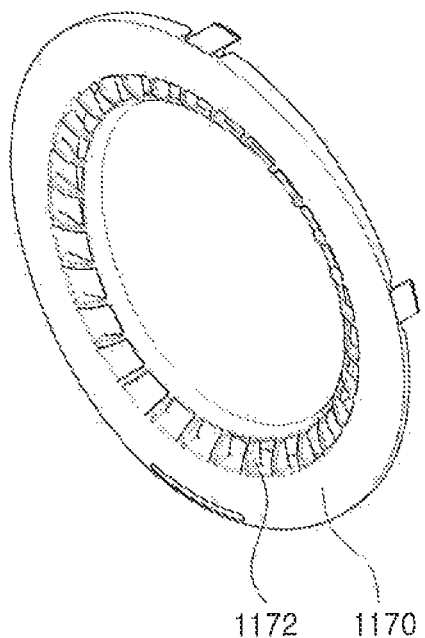
1172  1170

[FIG. 9]
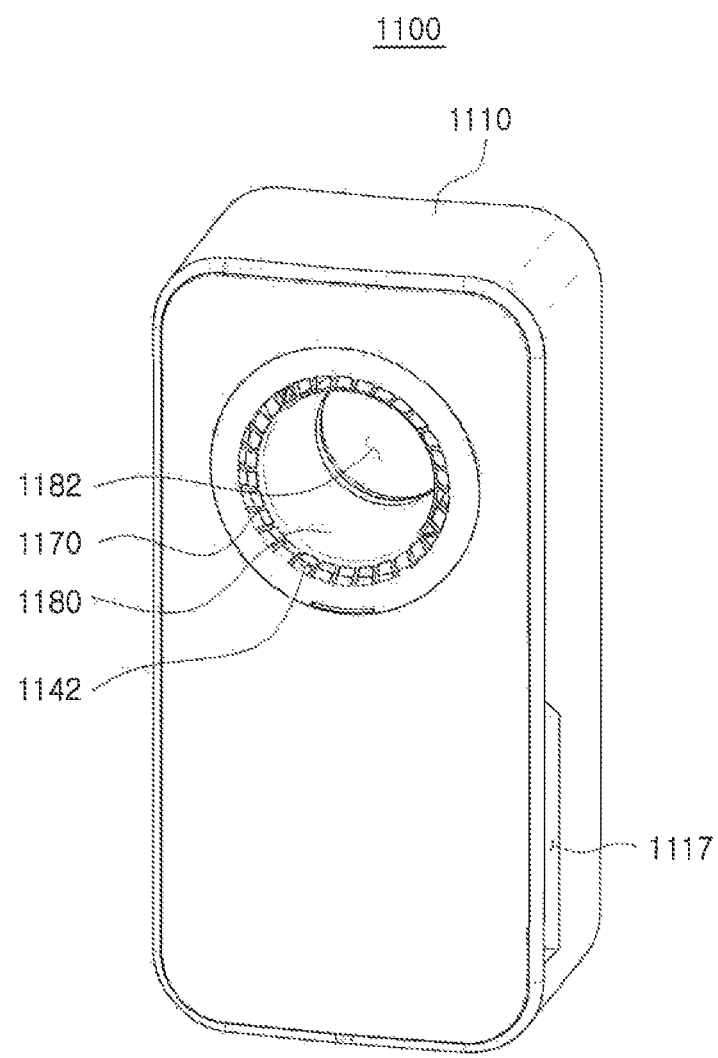

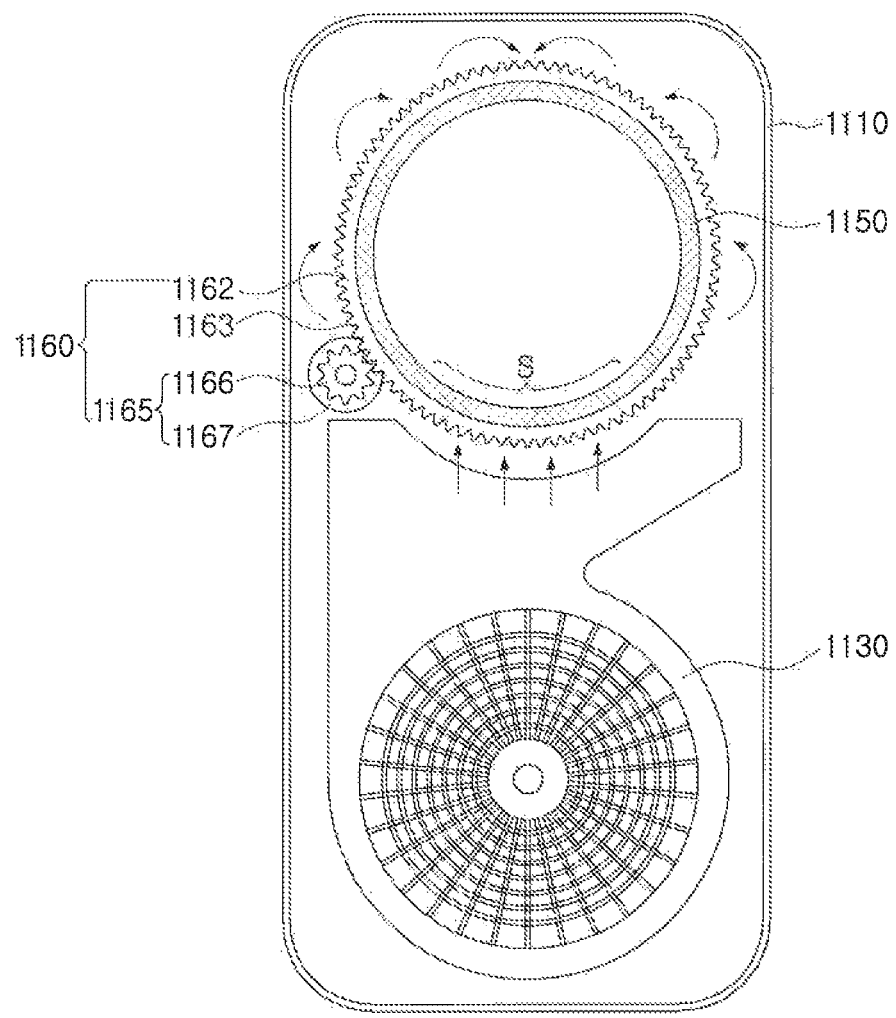
[FIG.10]

[FIG.11]
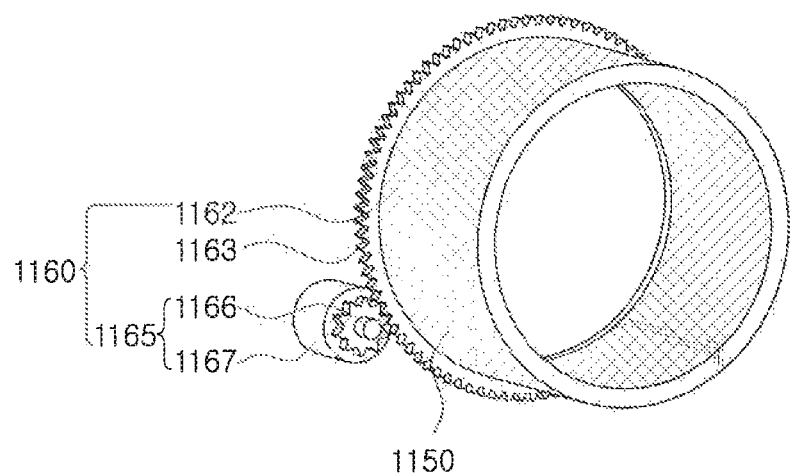

[FIG.12]
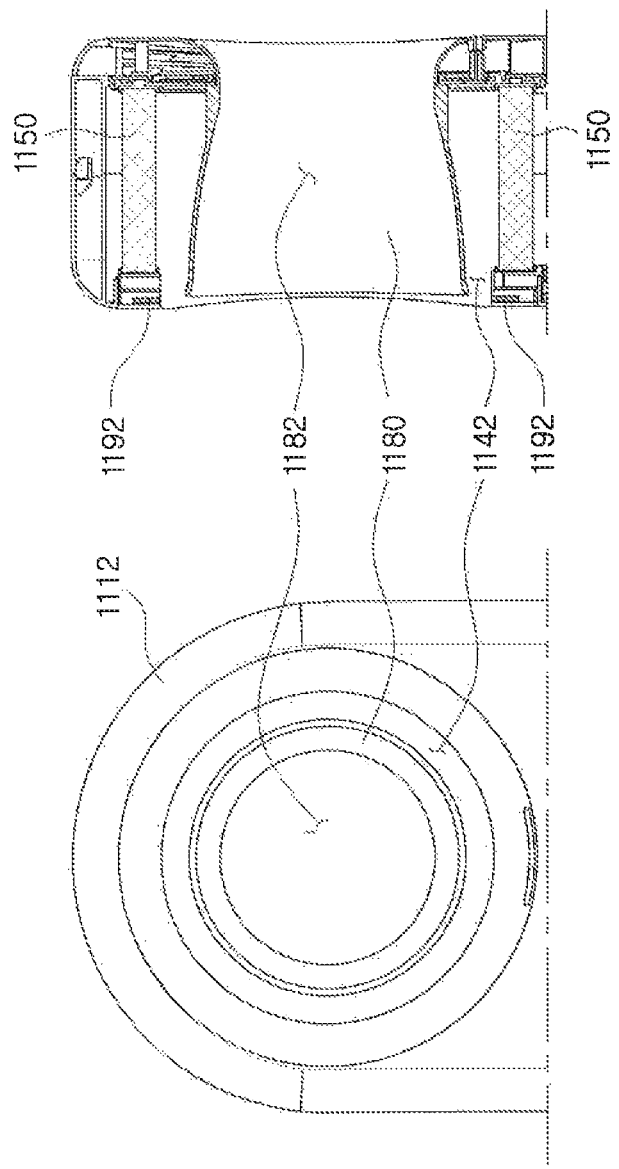

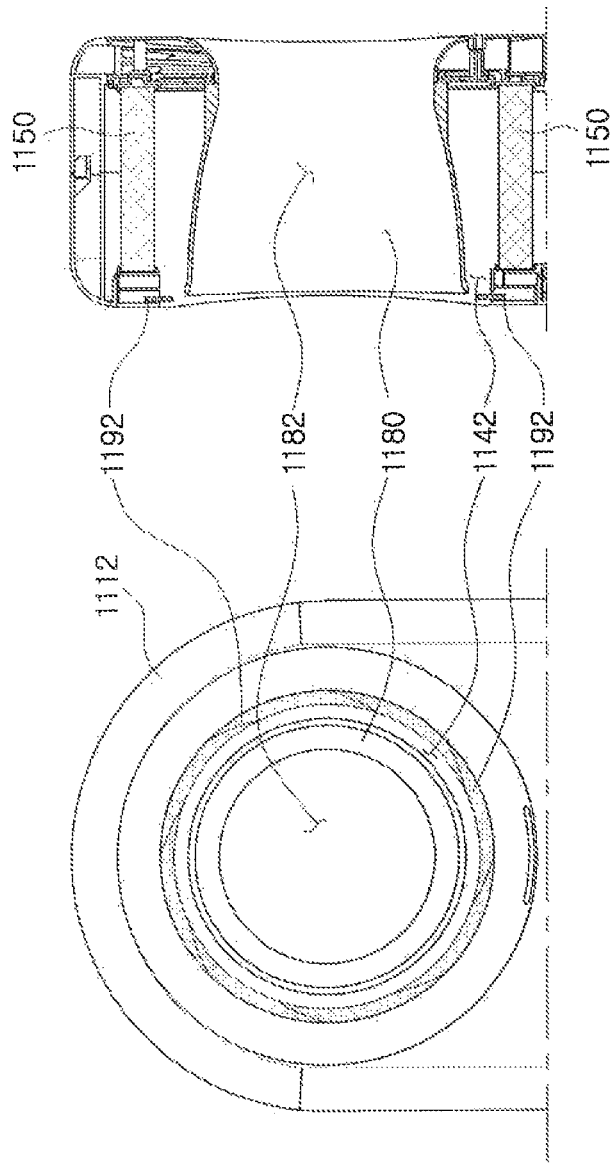
[FIG.13]

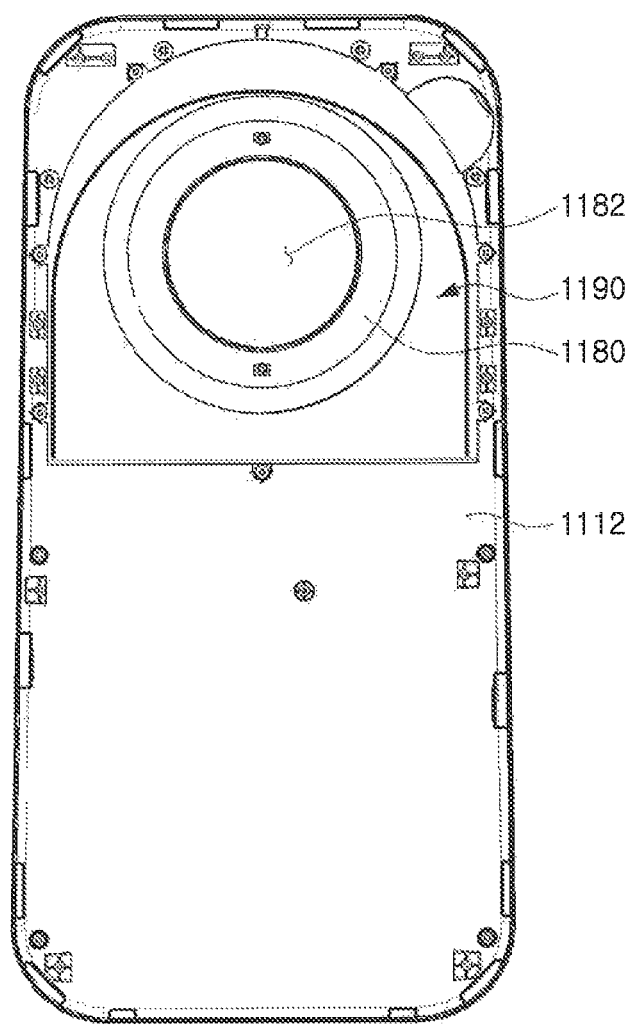
[FIG.14]

[FIG.15]
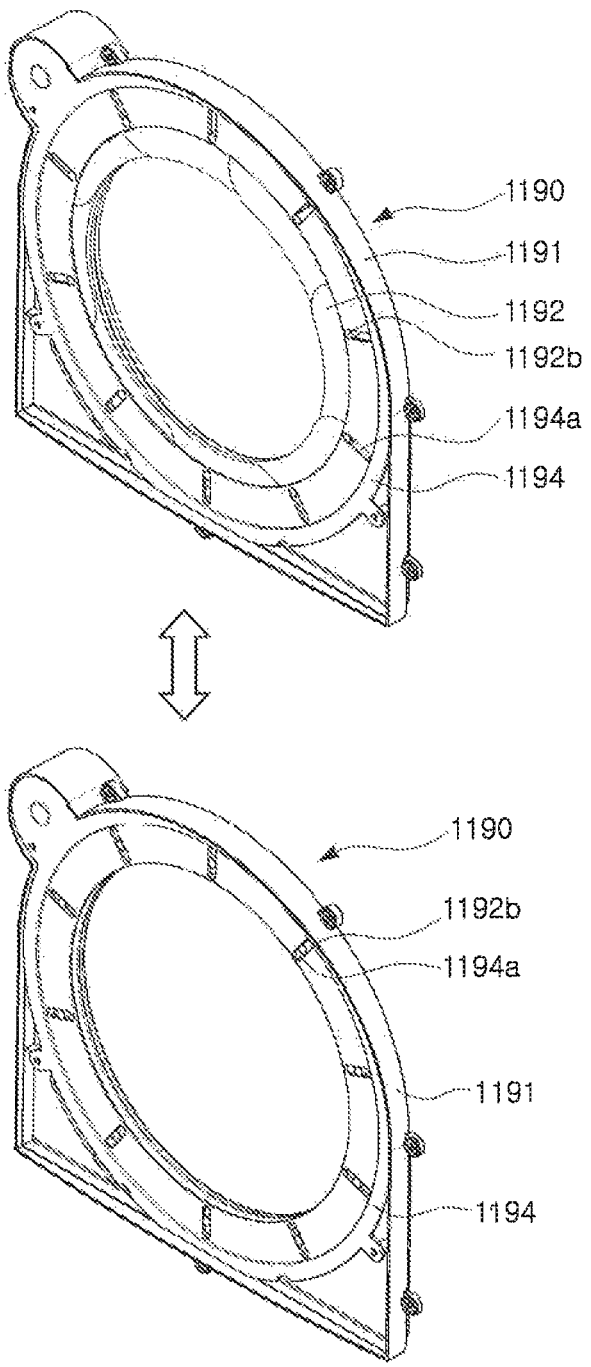

[FIG.16]
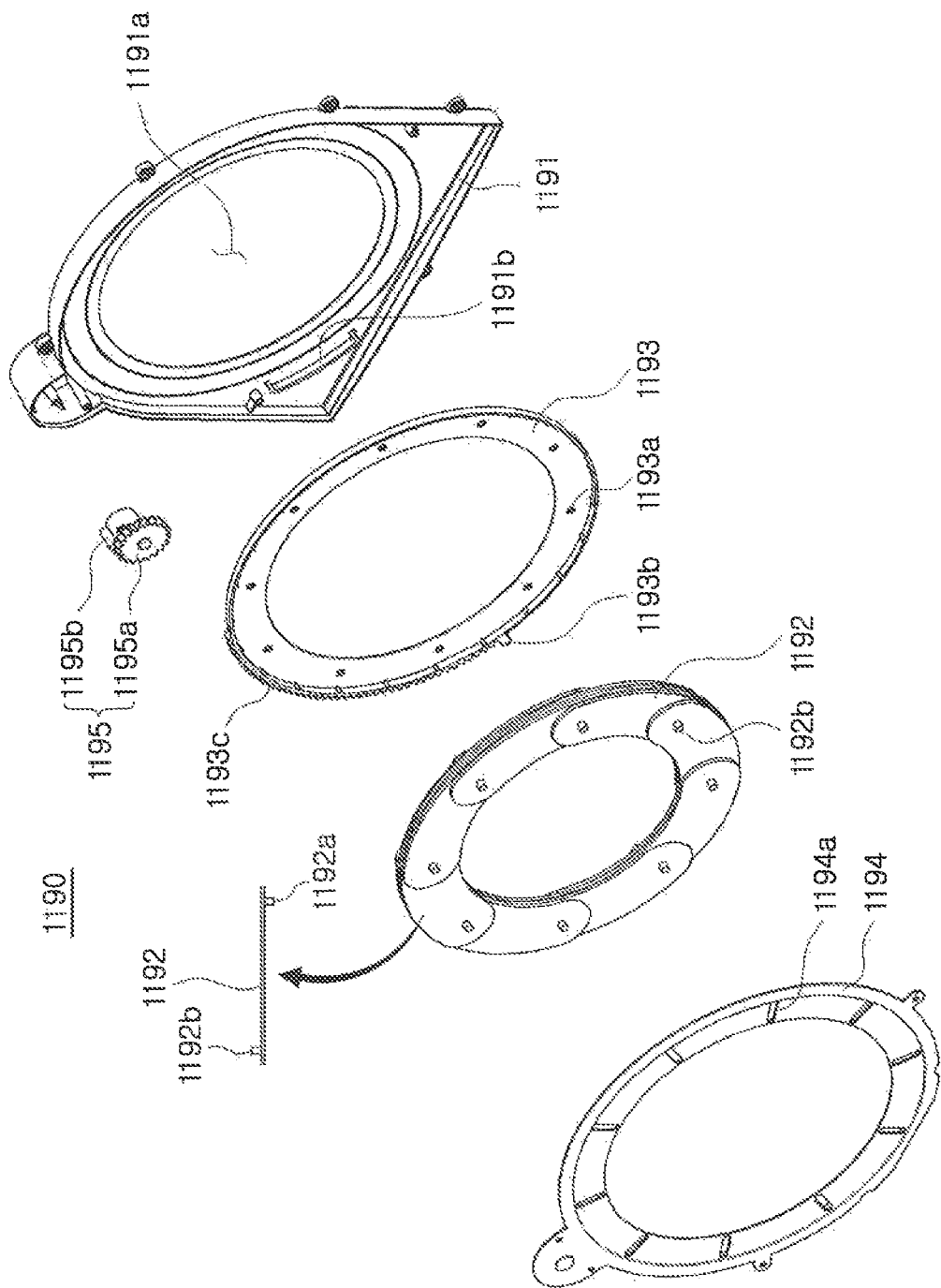

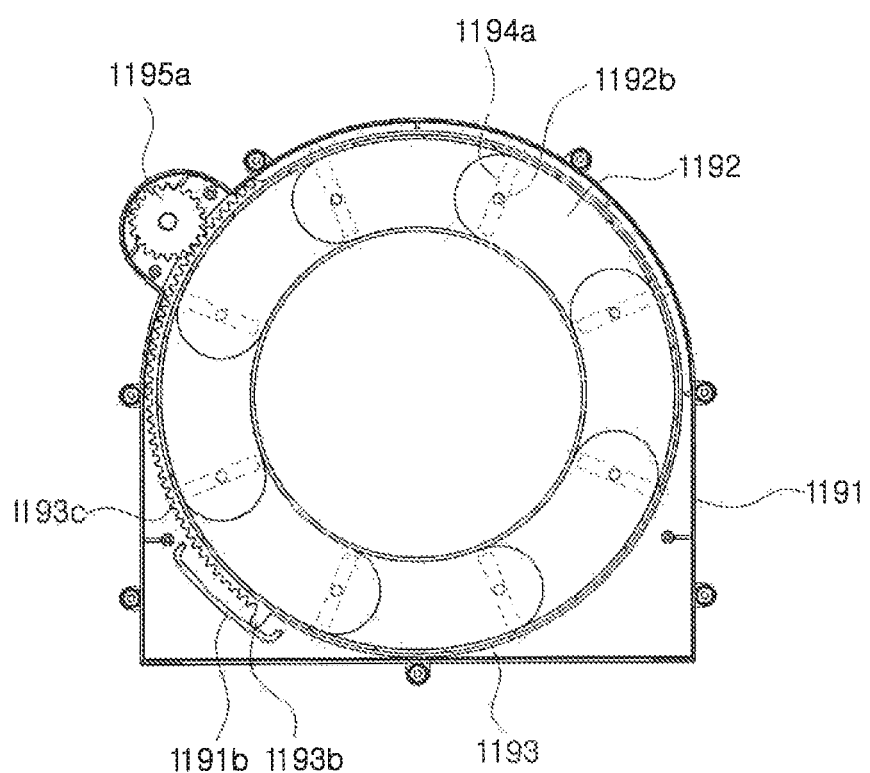
[FIG.17]

[FIG.18]
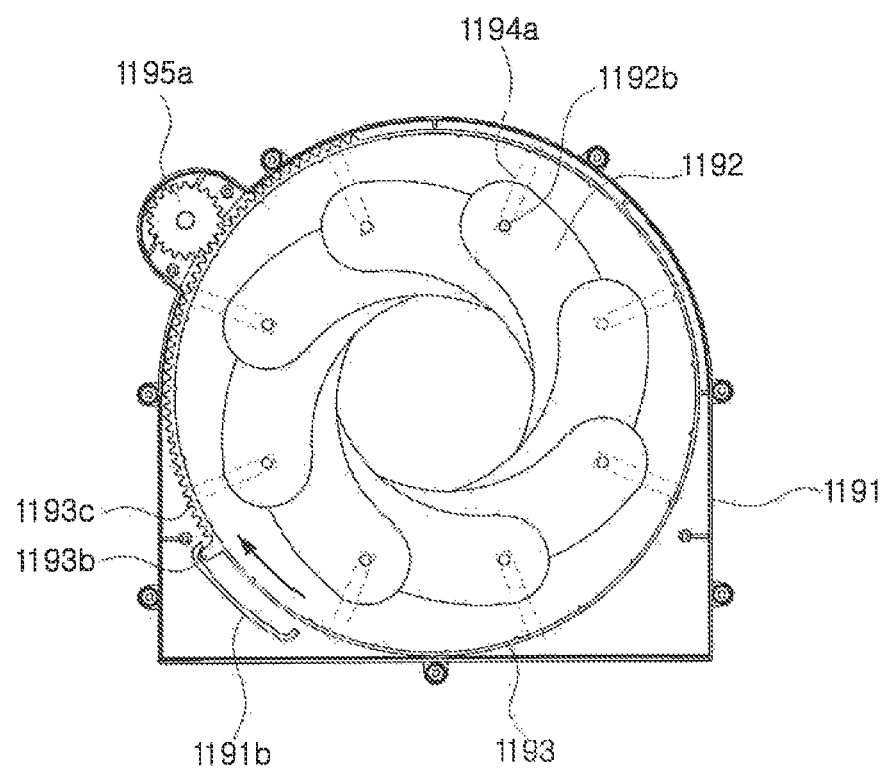

[FIG.19]
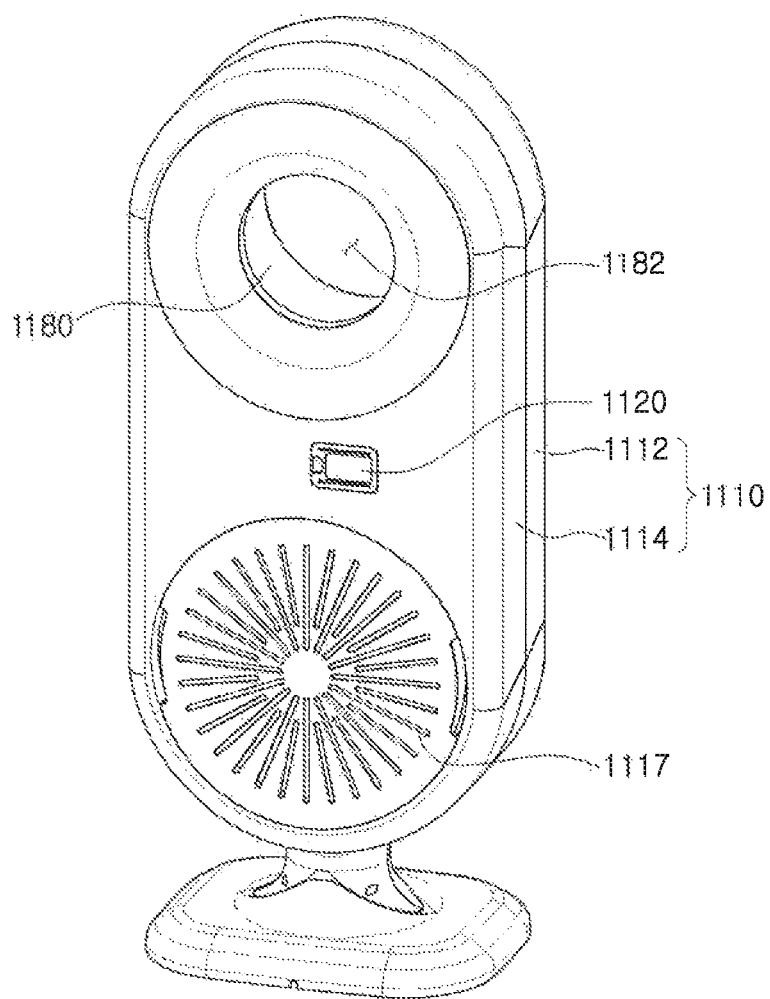

[FIG.20]
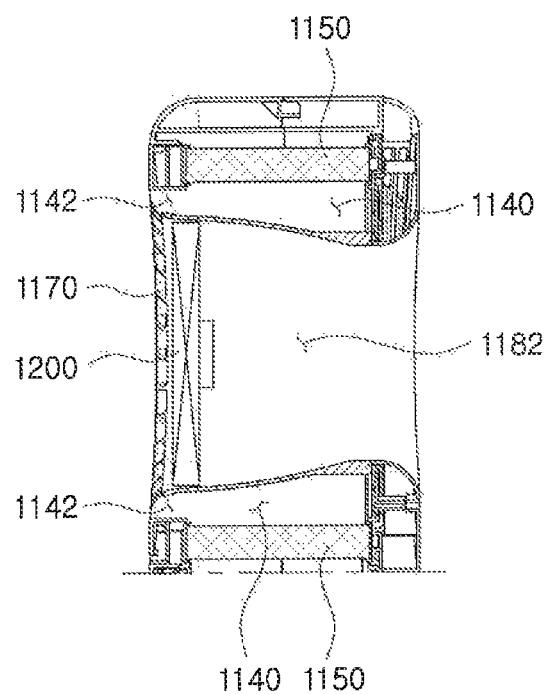

[FIG.21]
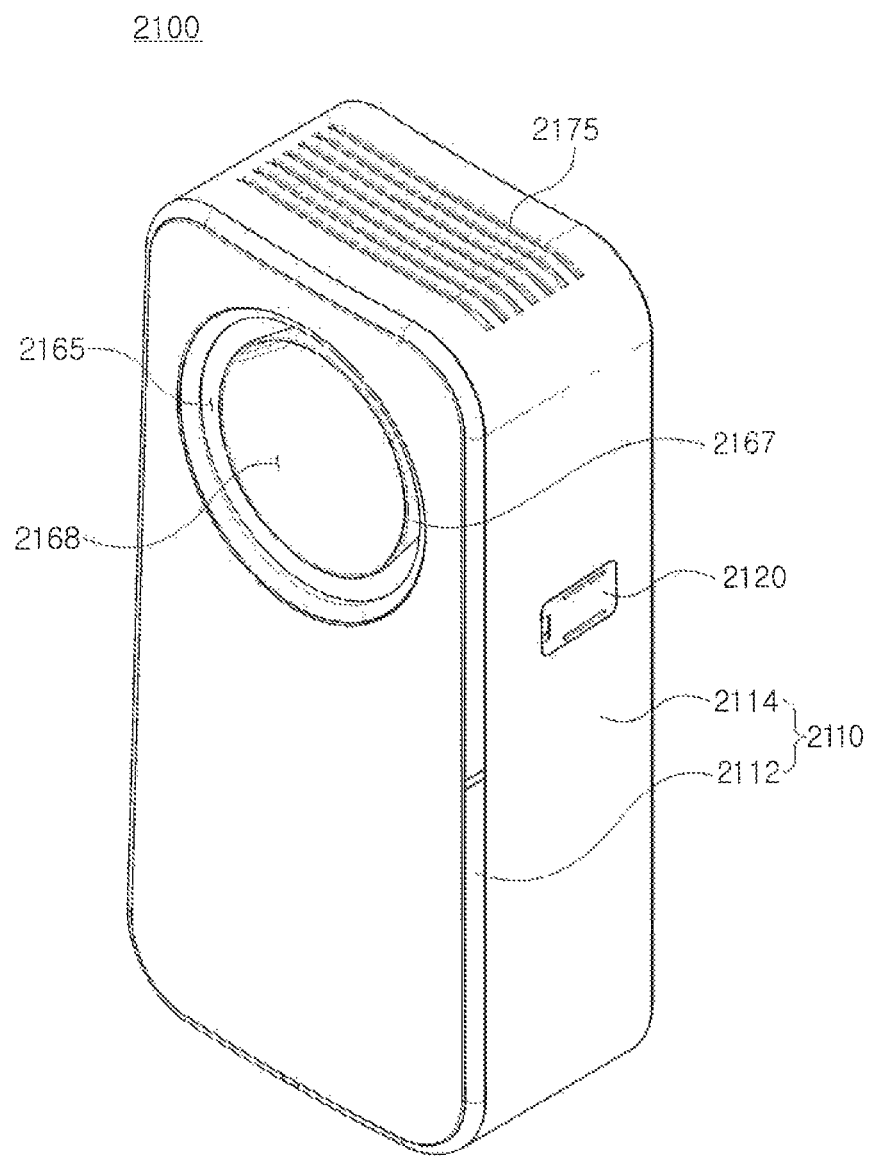

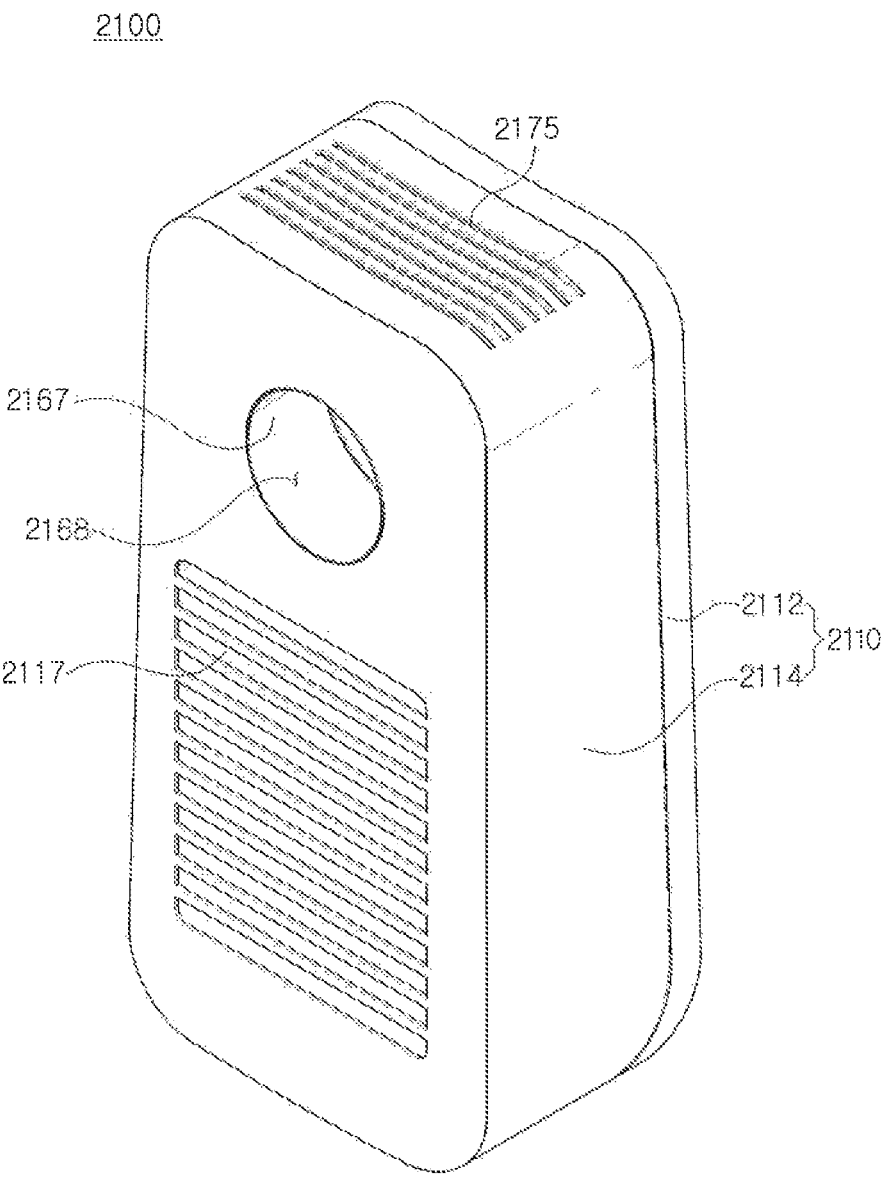
[FIG.22]

[FIG.23]
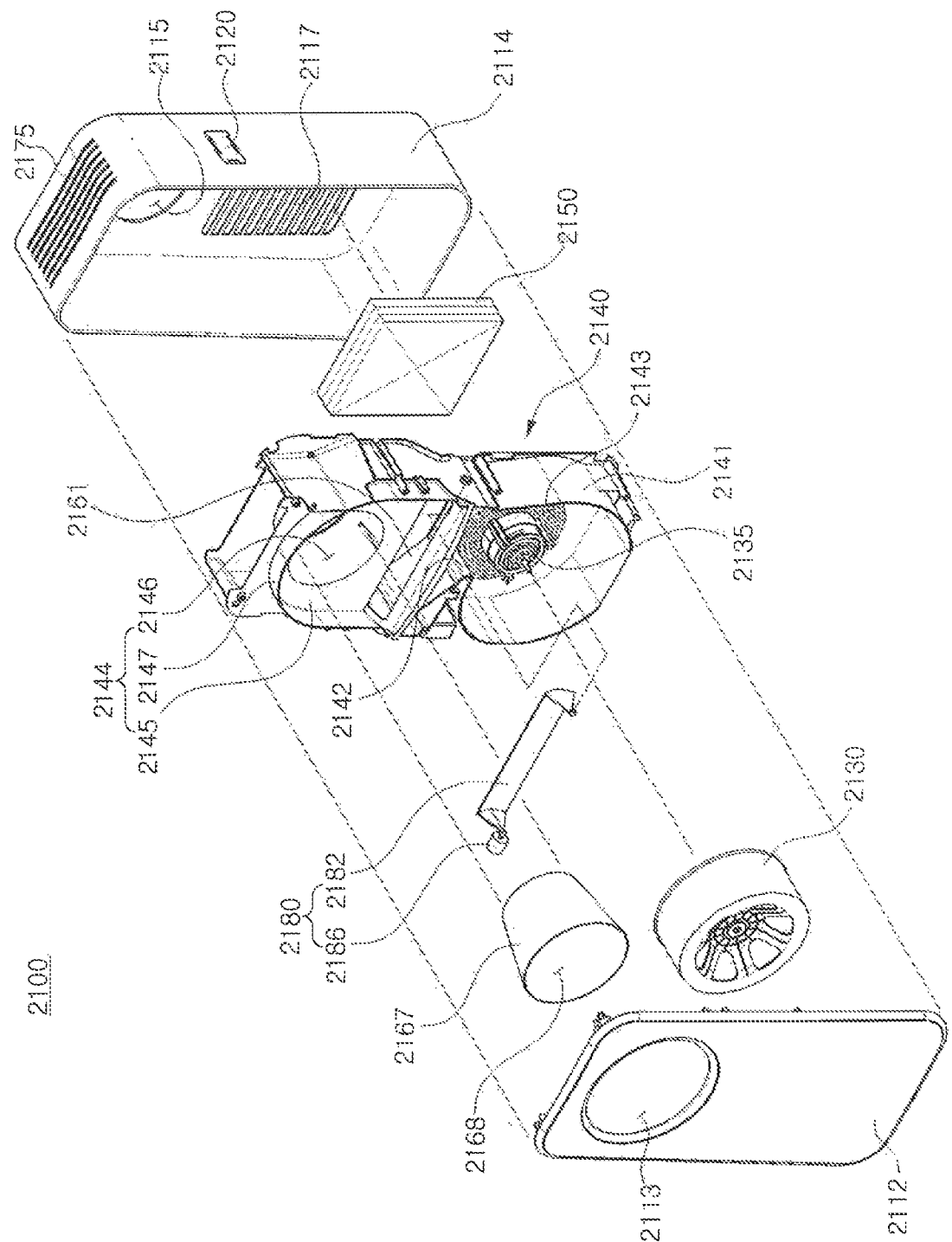

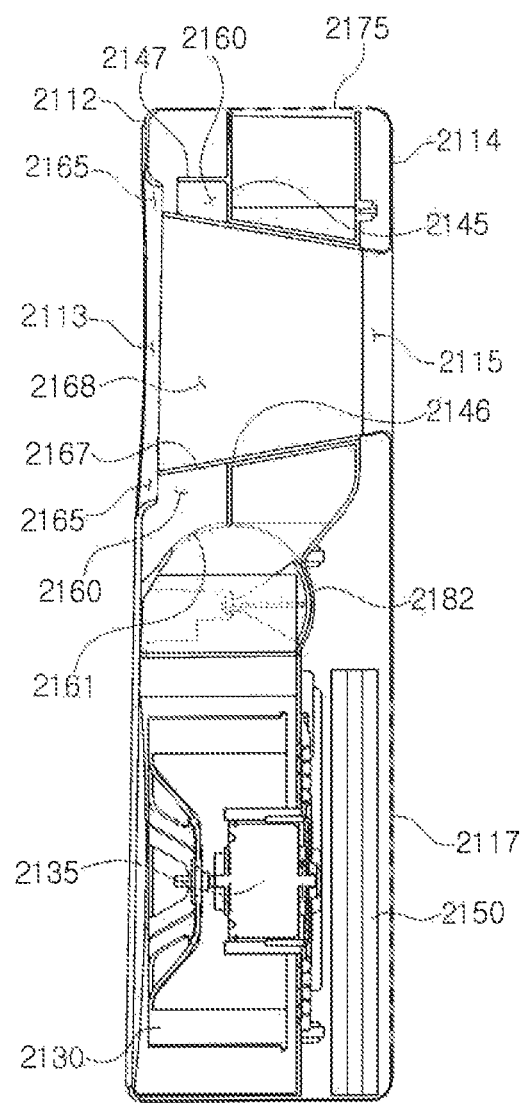
[FIG.24]

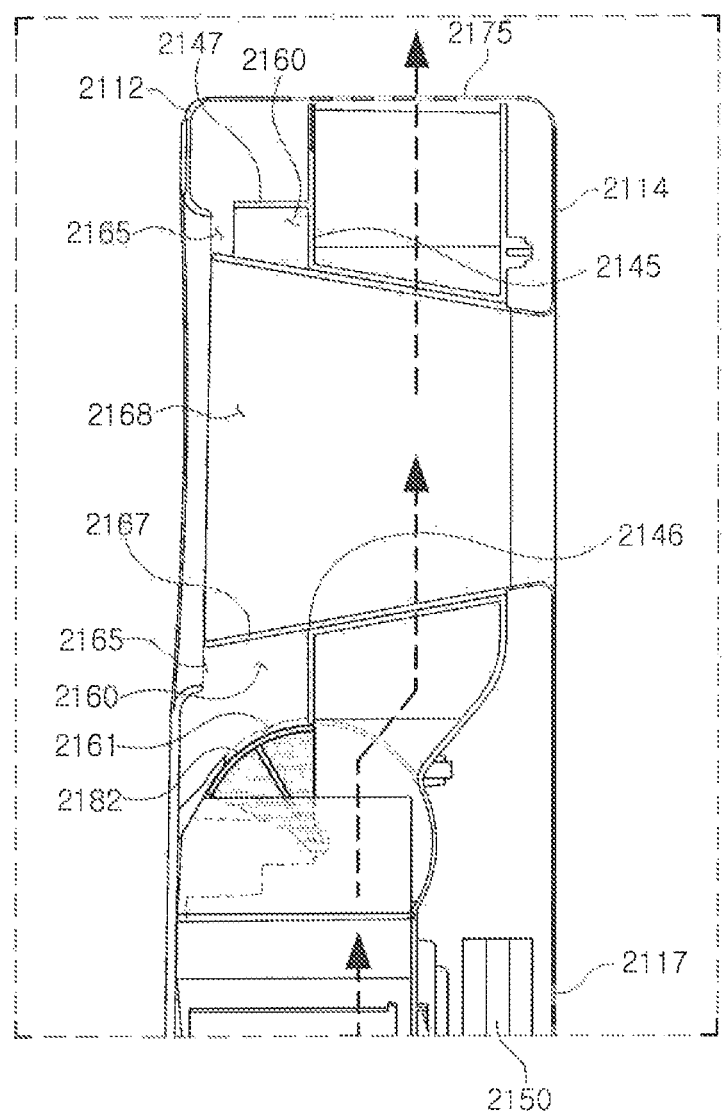
[FIG.25]

[FIG.26]
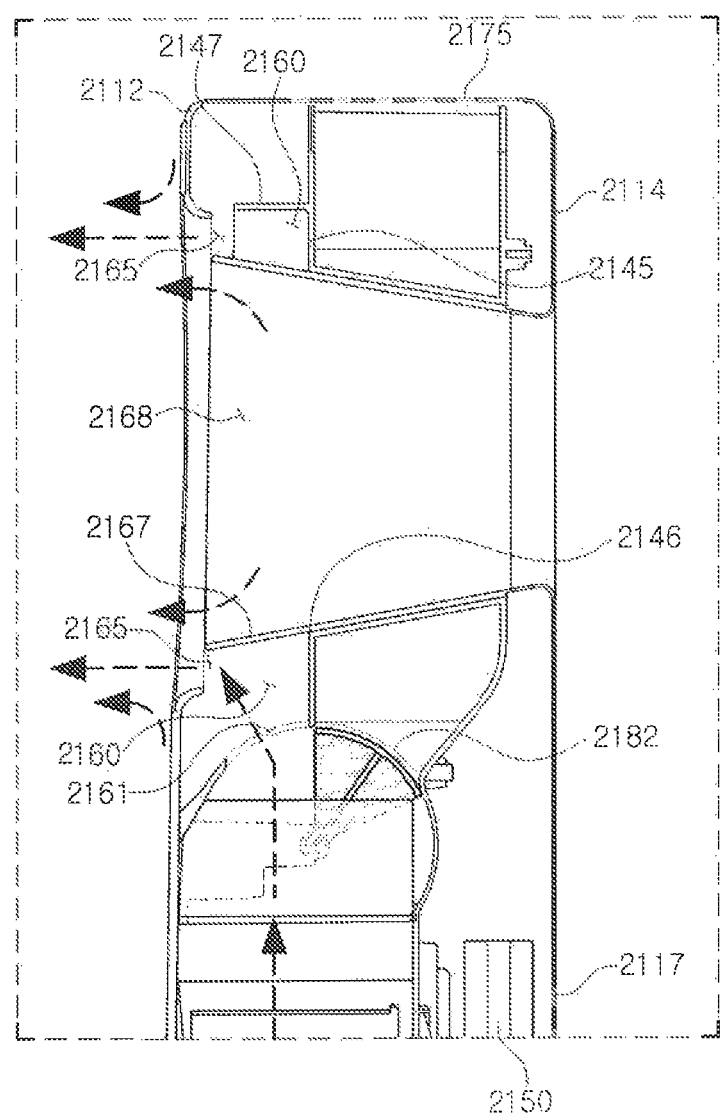

[FIG.27]
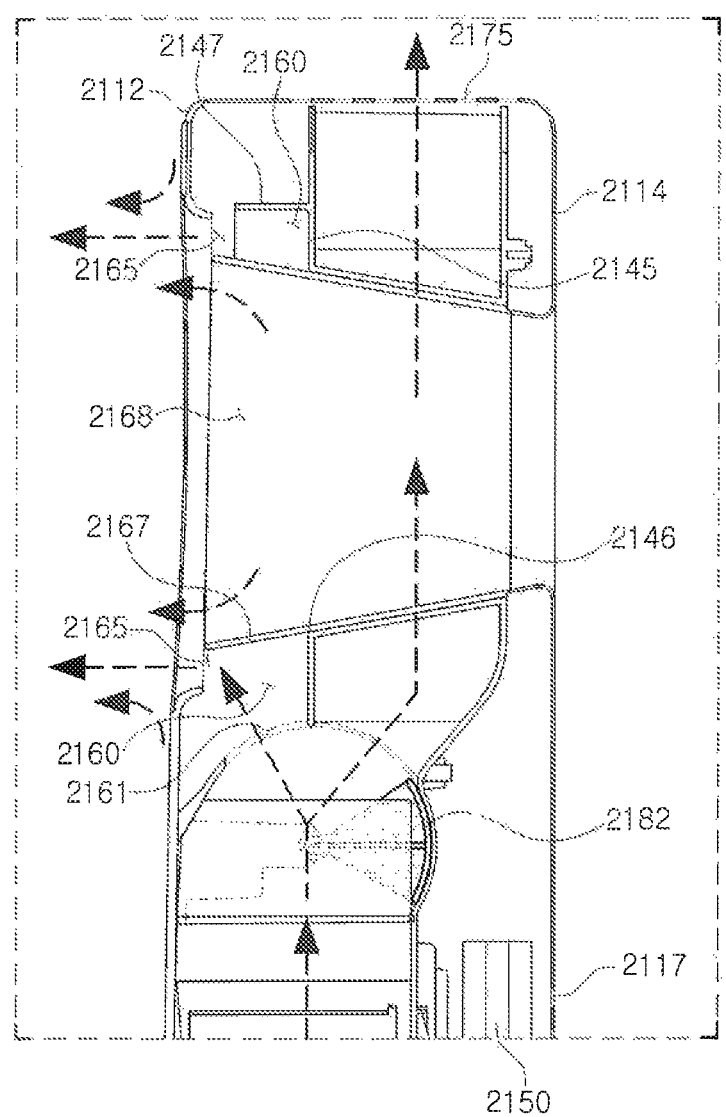

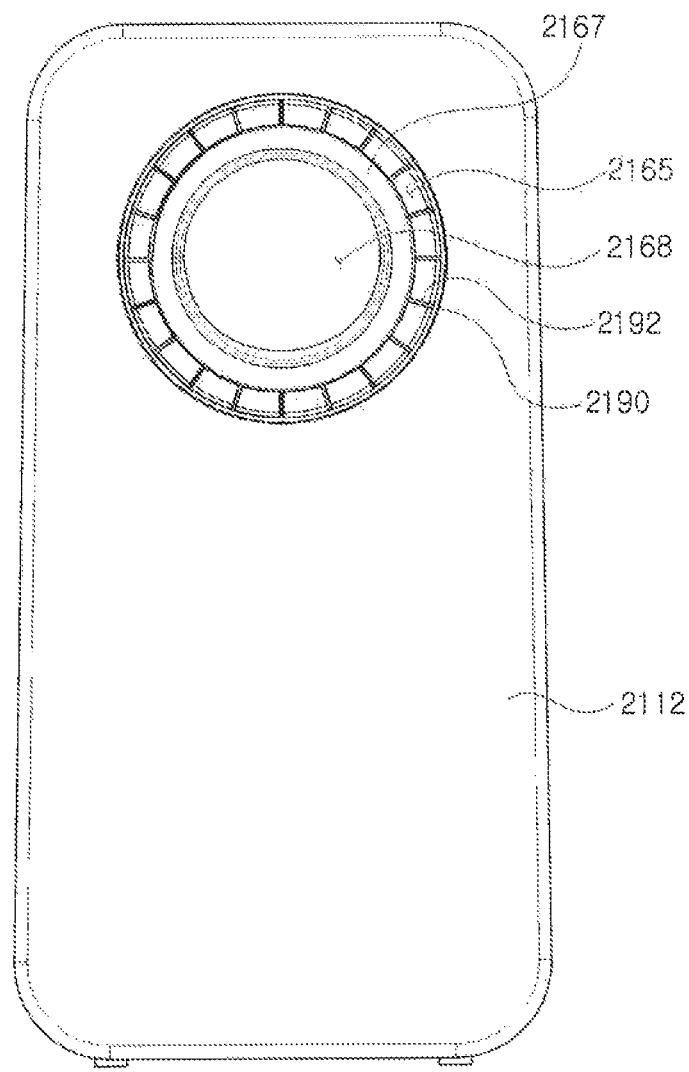
[FIG.28]

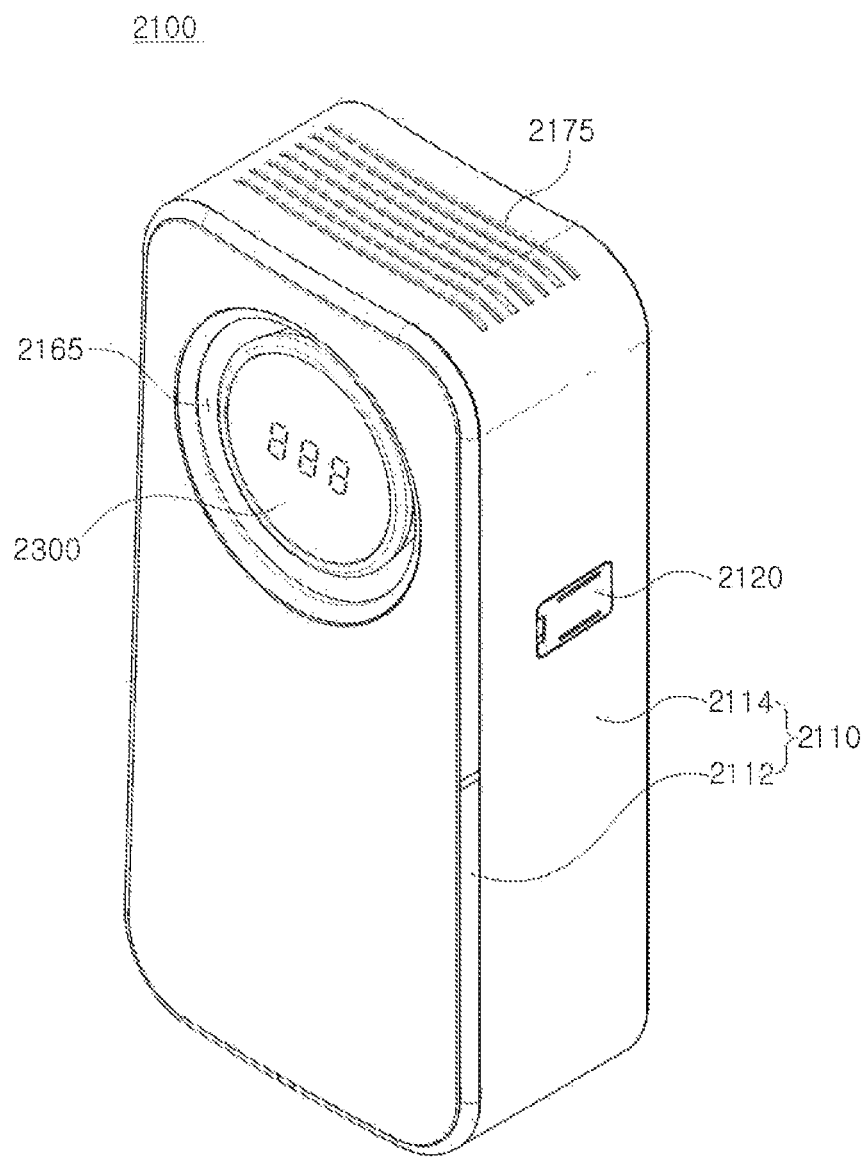
[FIG.29]

[FIG.30]
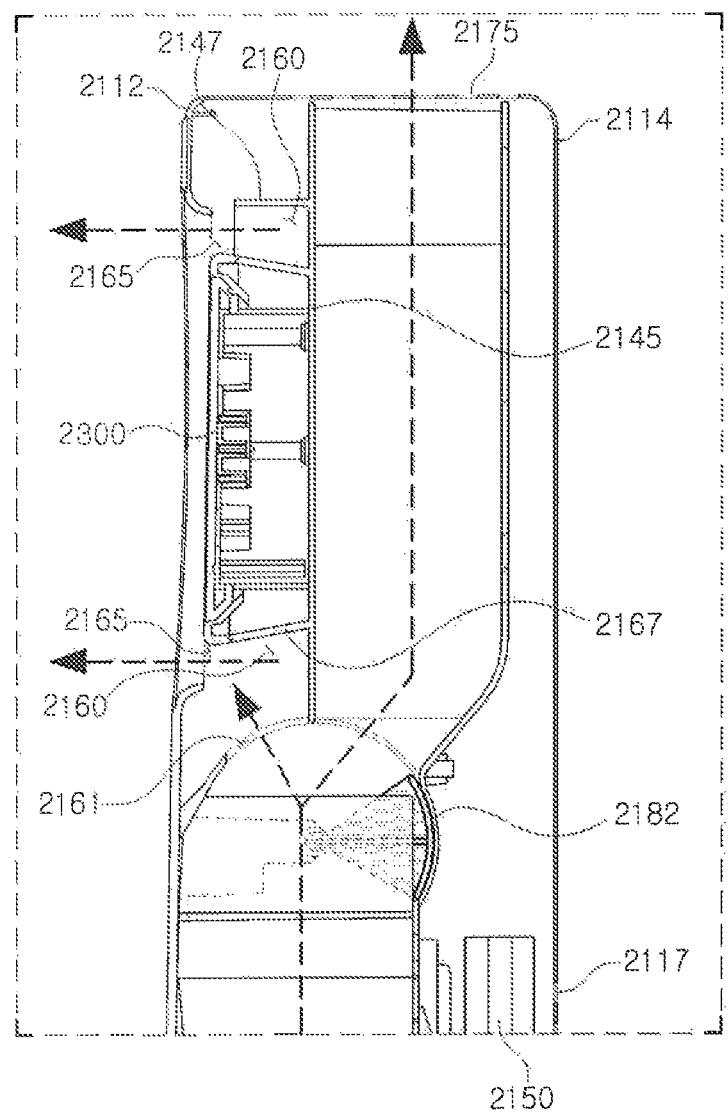

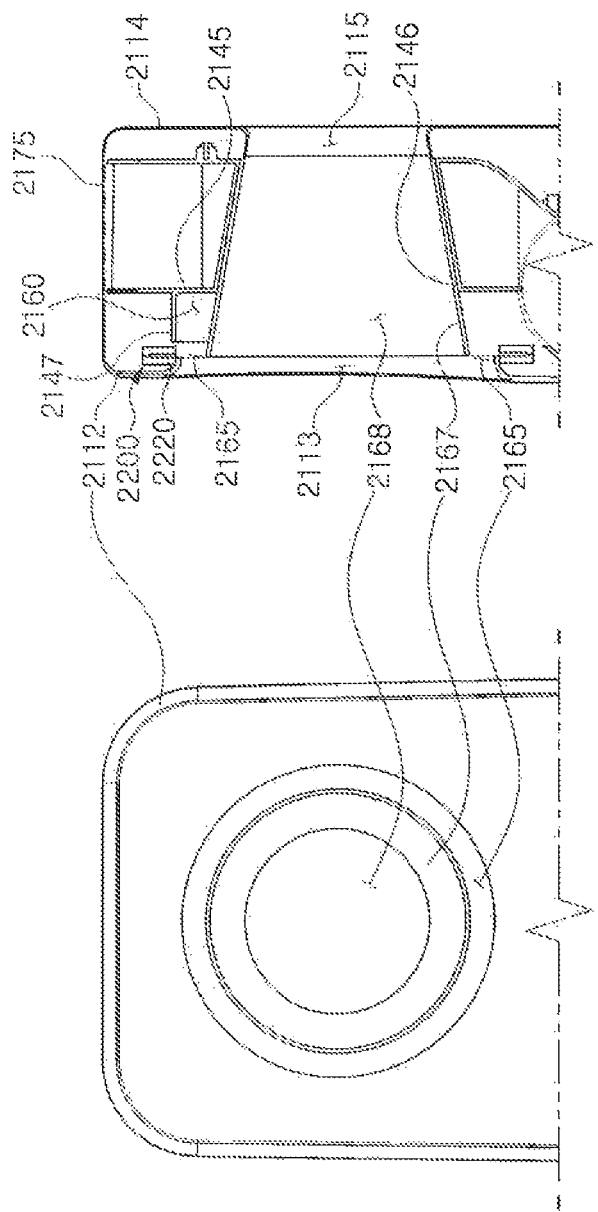
[FIG.31]

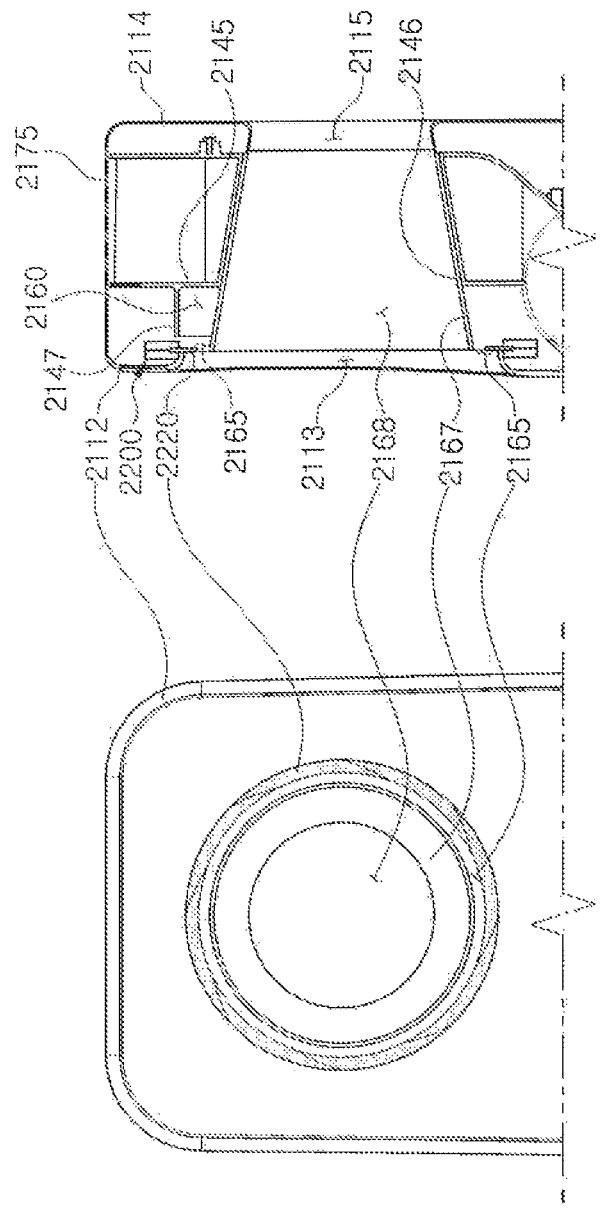
[FIG.32]

[FIG.33]
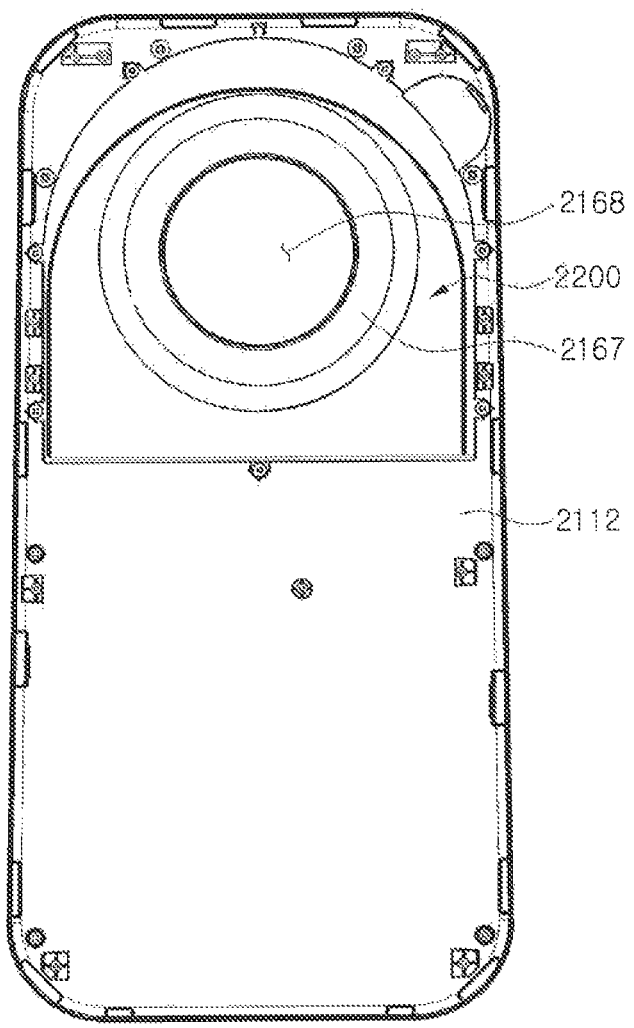

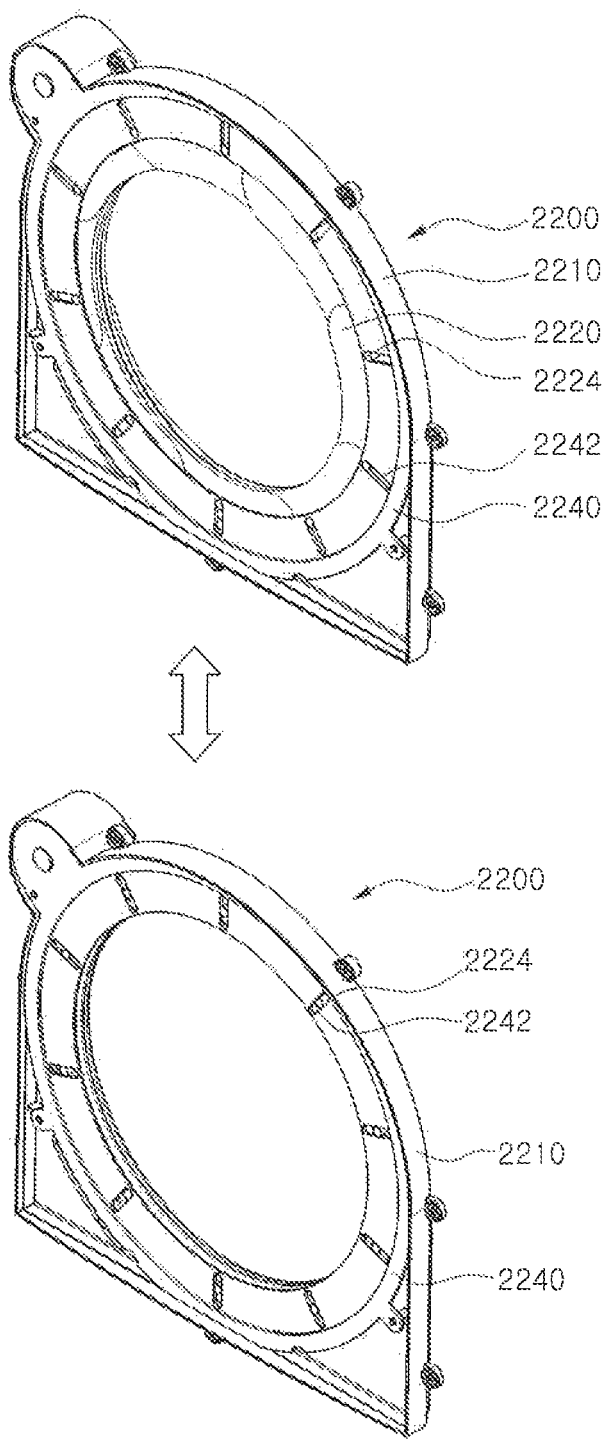
[FIG.34]

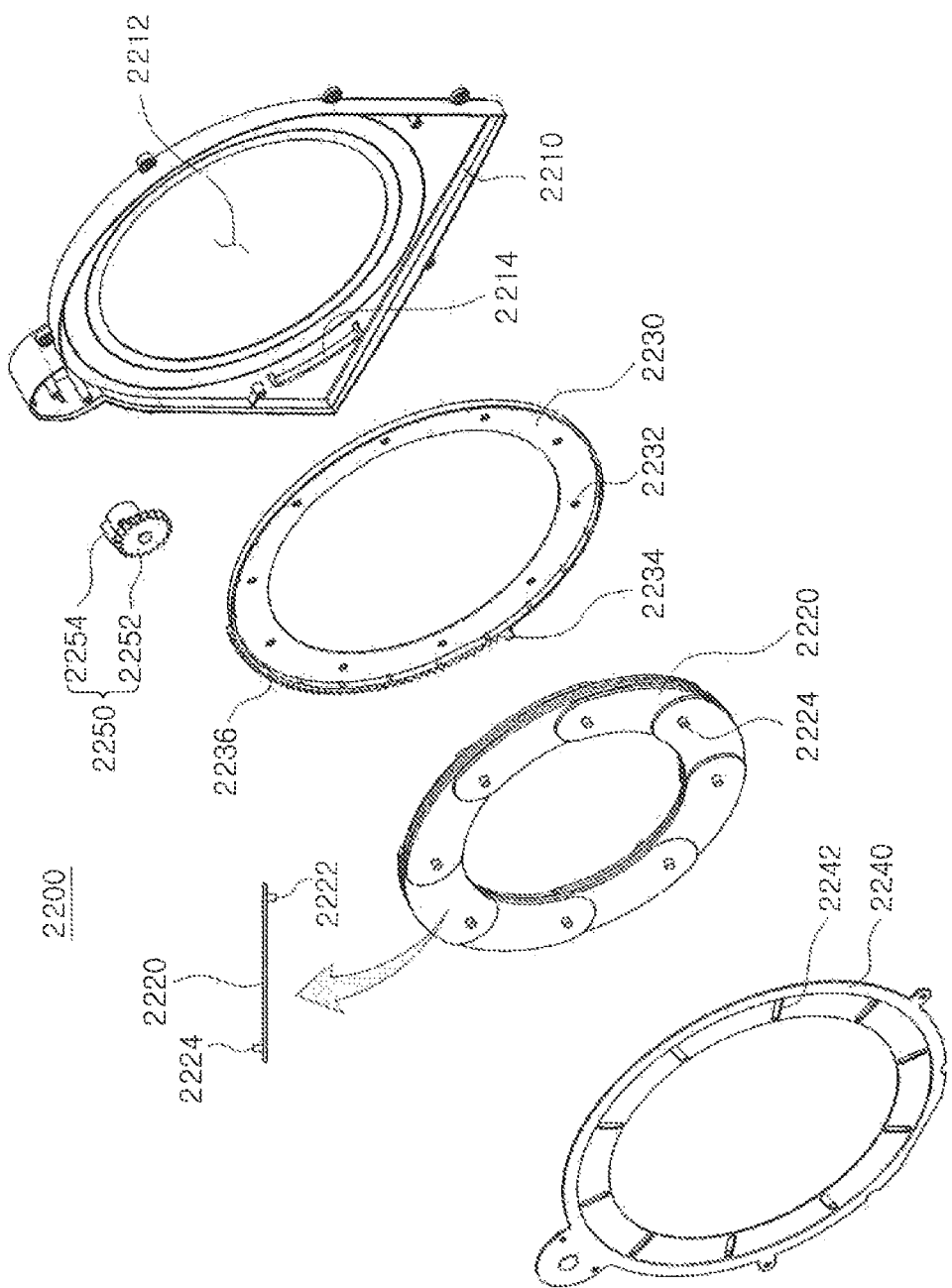

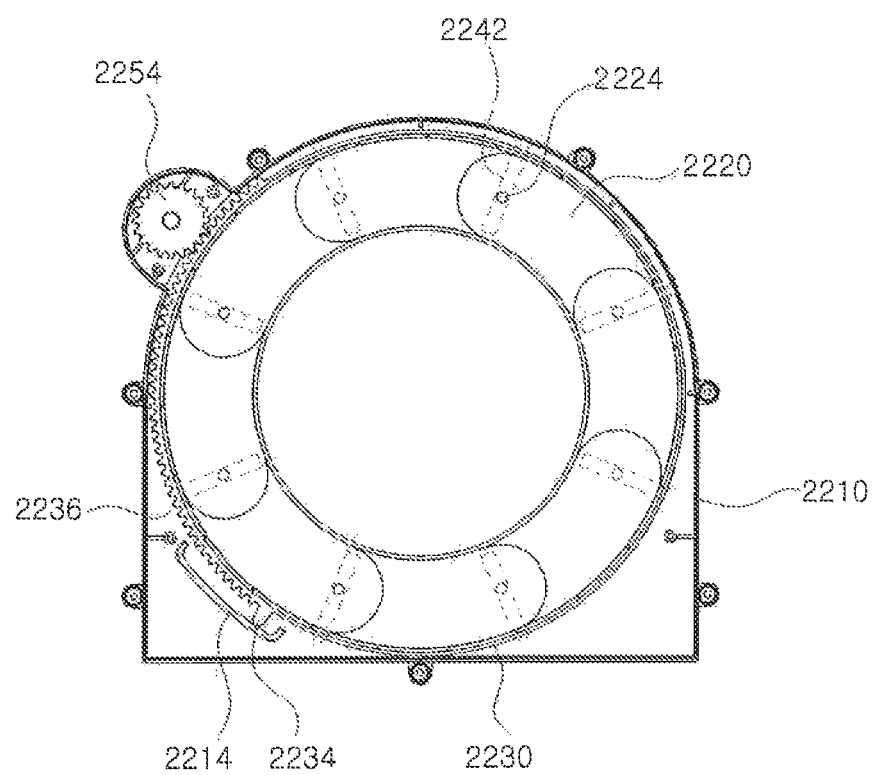
[FIG.36]

[FIG.37]
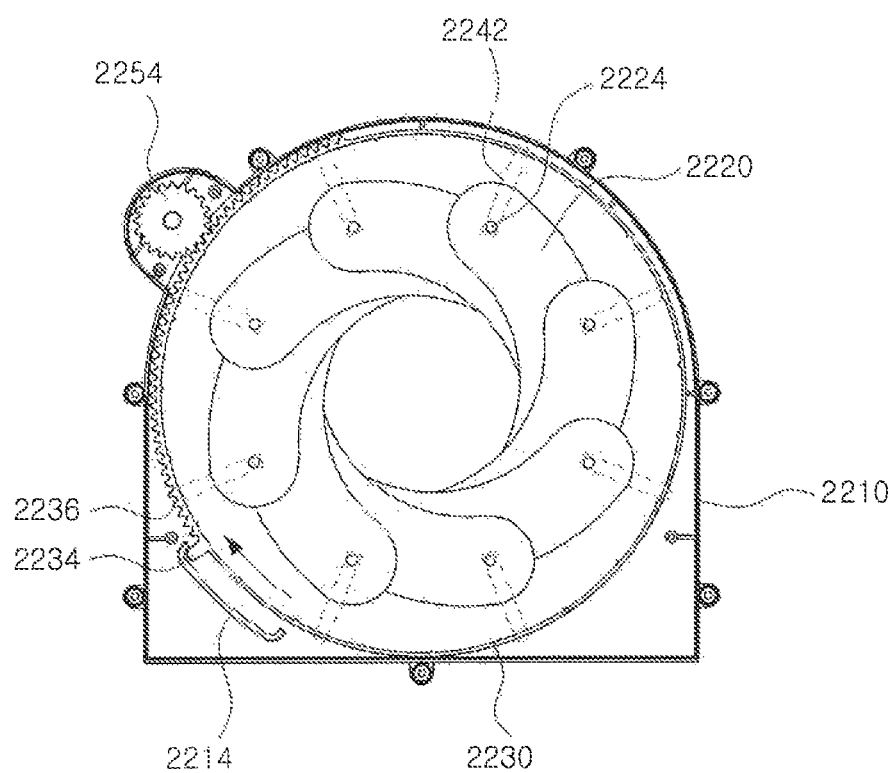

[FIG.38]
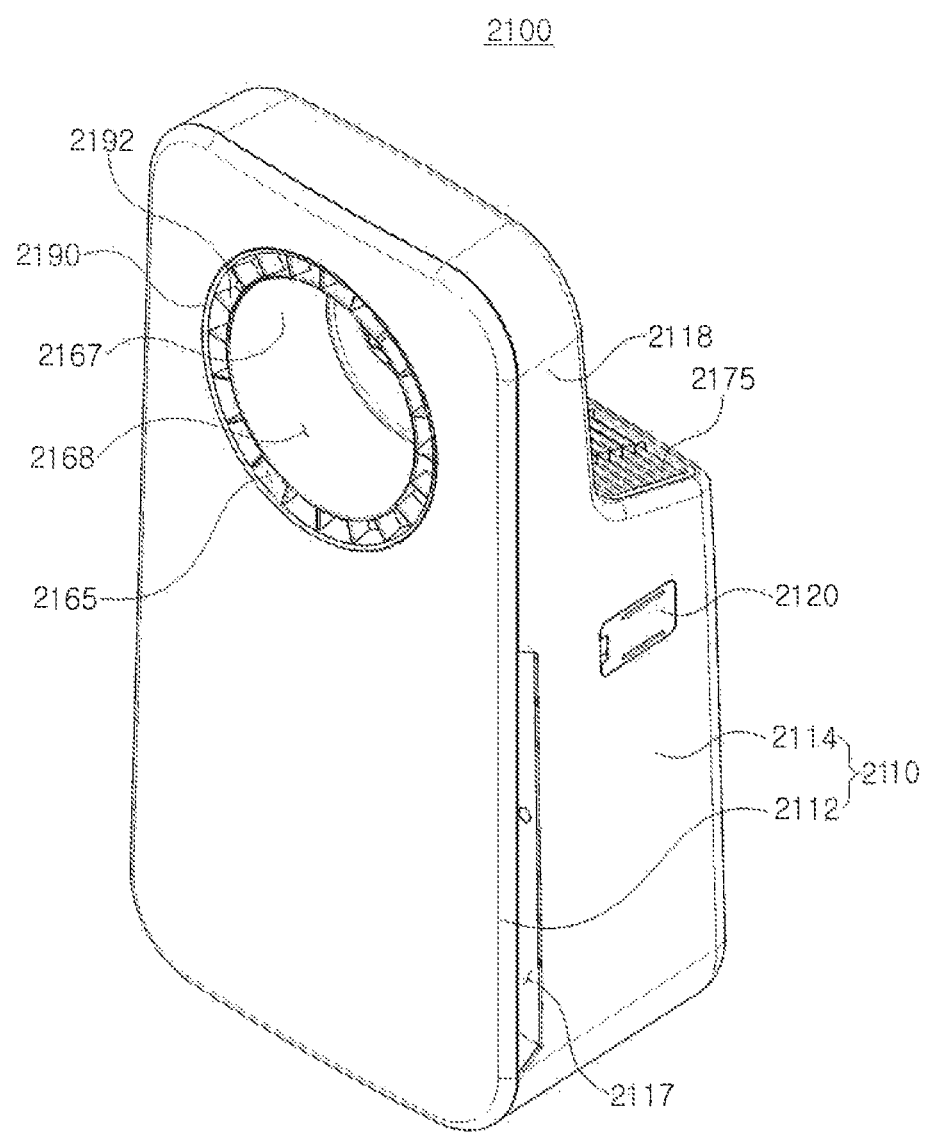

[FIG.39]
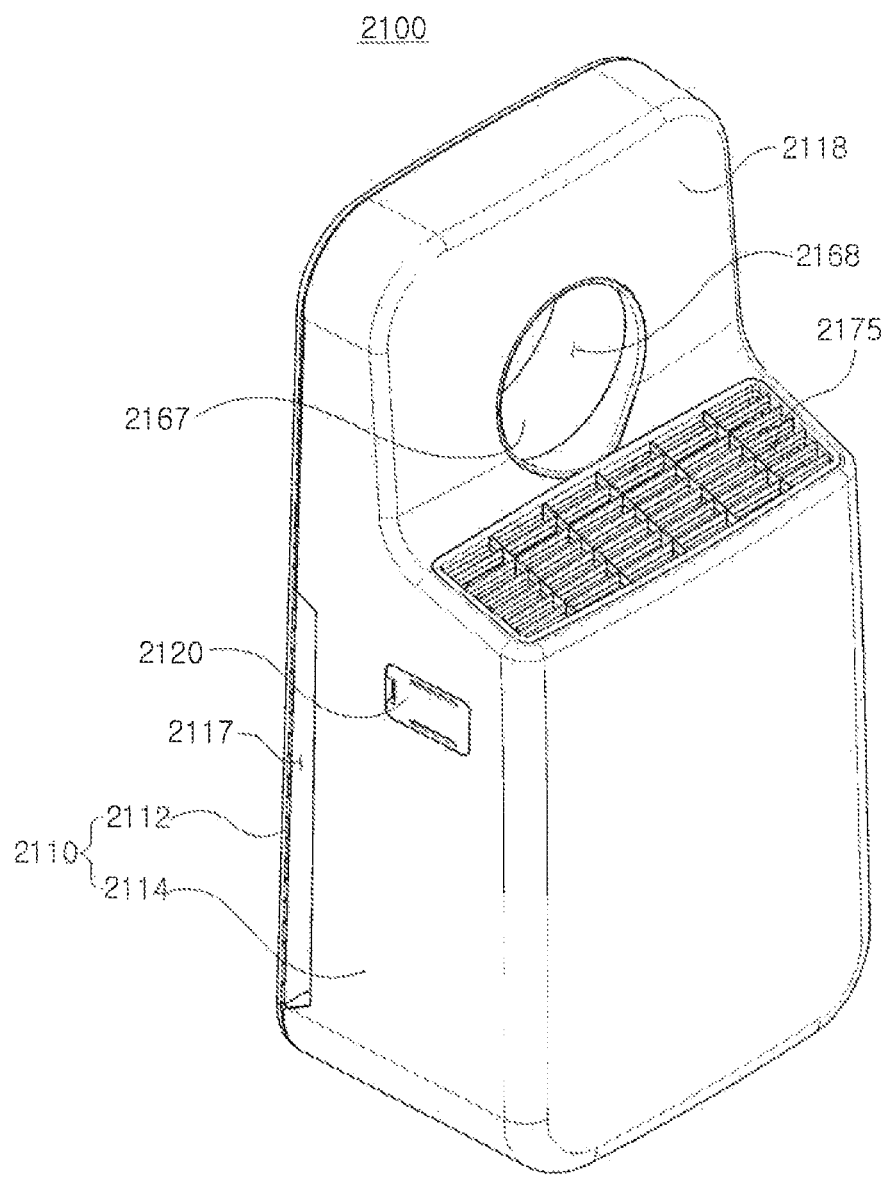

[FIG.40]
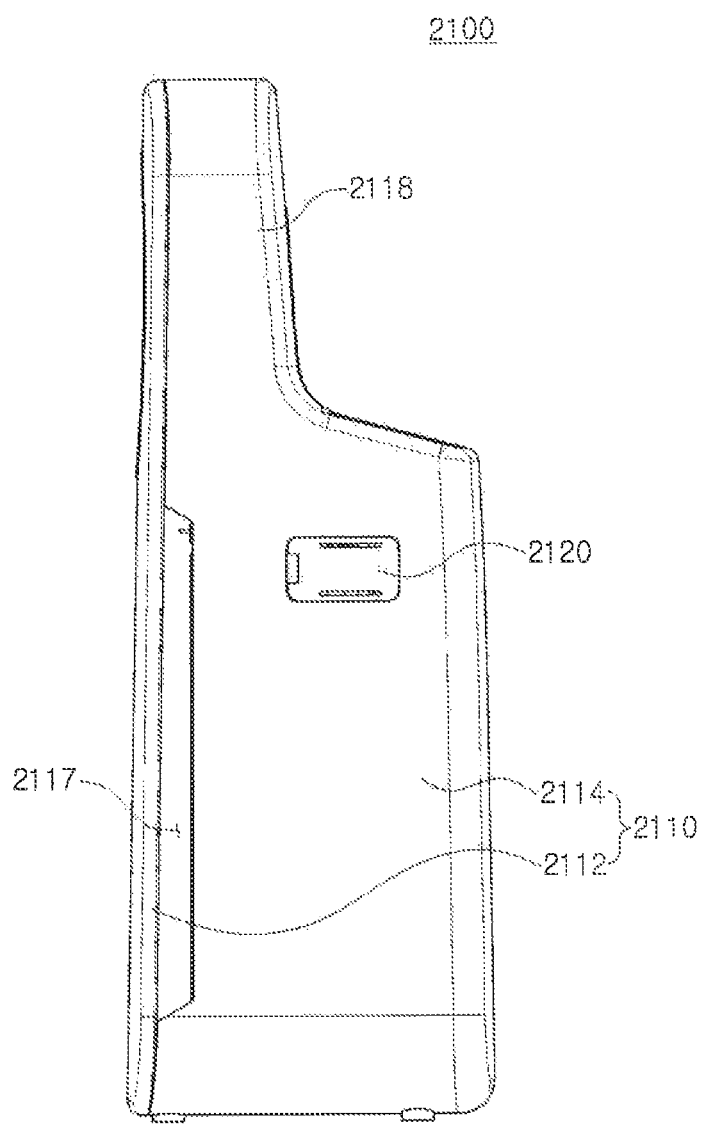

[FIG.41]
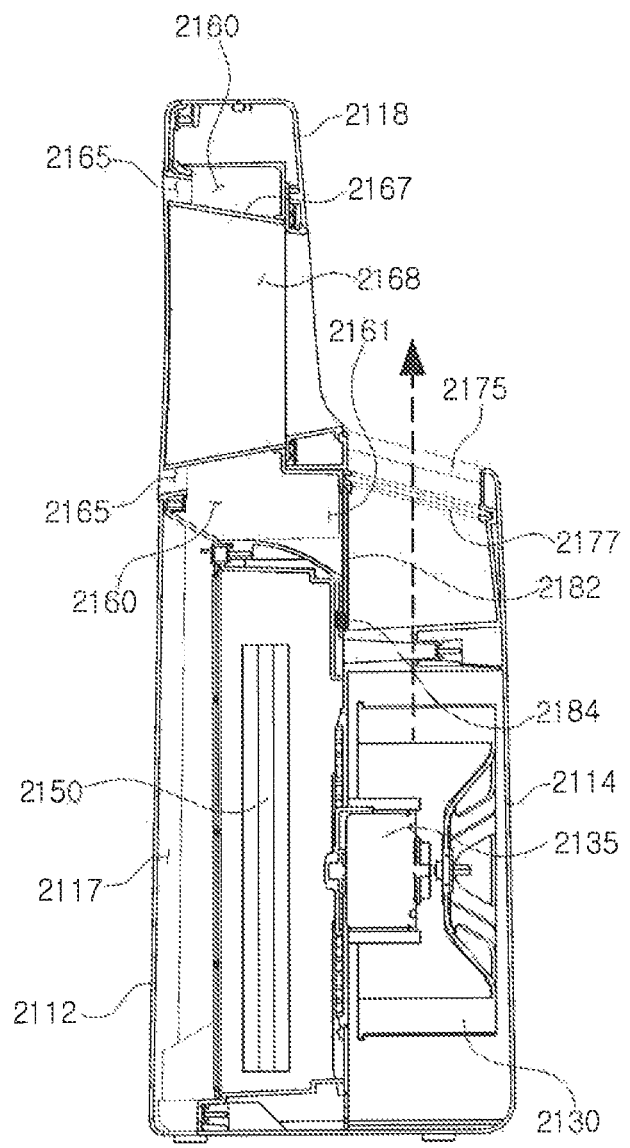

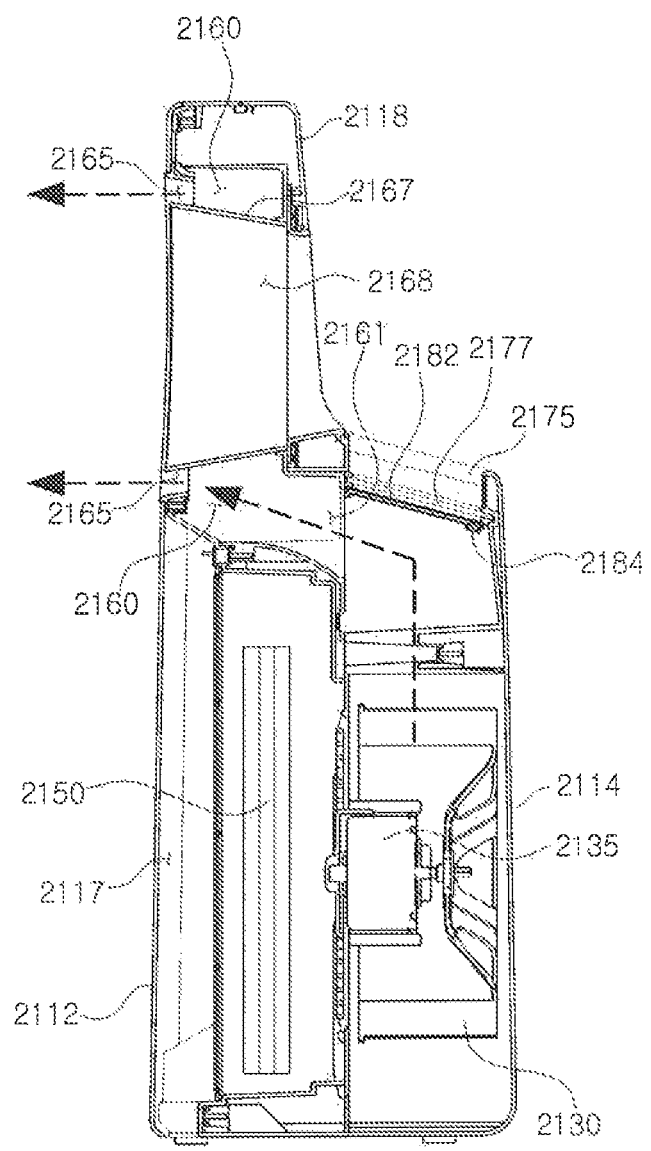
[FIG.42]

[FIG.43]
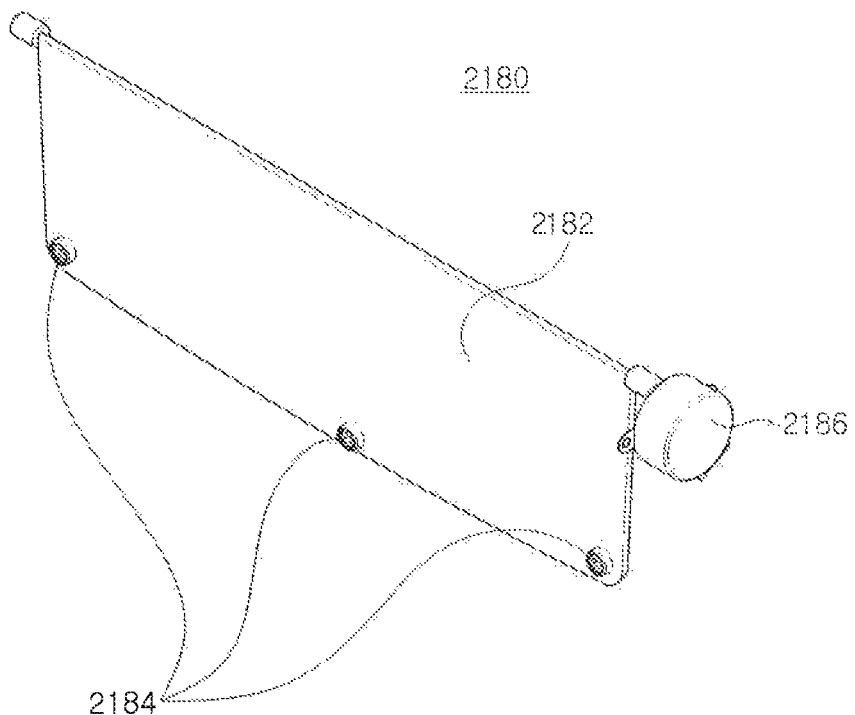

AIR PURIFIER

CROSS REFERENCE TO RELATED APPLICATIONS

This application is the U.S. National Stage entry of International Application Number PCT/KR2016/011011 filed under the Patent Cooperation Treaty having a filing date of Sep. 30, 2016, which claims priority to Korean Patent Application Serial Number 10-2015-0170672 having a filing date of Dec. 2, 2015, and Korean Patent Application Serial Number 10-2015-0172527 having a filing date of Dec. 4, 2015, which are incorporated herein by reference.

TECHNICAL FIELD

The present disclosure relates to an air purifier, and particularly, to an air purifier capable of quickly circulating indoor air.

BACKGROUND ART

An air purifier according to the related art has a structure for blowing air through a discharge port which is open in a circular or polygonal form in the front or upper end of a product.

In the air purifier according to the related art, described above, due to a wide opening area of a discharge port, a volume of air per unit time may be large. However, there may be a disadvantage, in that a flow rate of discharged air may be low, so that a speed for circulating indoor air is low. In this case, to increase a flow rate, the number of revolutions of a fan is required to be increased. However, there may be a disadvantage in that noise is generated due to the number of revolutions of a fan being increased.

Meanwhile, when an area of a discharge port is reduced to solve the disadvantages described above, a volume of air is small and air is discharged through a small area. Thus, there is a disadvantage in that an indoor air circulation speed may below.

DISCLOSURE

Technical Problem

An aspect of the present disclosure may provide an air purifier for securing a large volume of air and high rate of flow of discharged air and achieving improvement in aesthetic design of a product.

An aspect of the present disclosure may provide an air purifier capable of using an entire area of a filter in a balanced manner.

An aspect of the present disclosure may provide an air purifier capable of adjusting a flow rate and a discharge form of discharged air.

Technical Solution

According to an aspect of the present disclosure, an air purifier includes: a housing; a blower fan provided in the housing; and an annular discharge flow path, configuring a path through which air, inside the housing flowing by the blower fan, is discharged externally, formed in the housing while having an annular discharge end, and having a cross section, narrowing from an interior of the housing to the discharge end.

According to an aspect of the present disclosure, an air conditioner includes: a housing; a blower fan provided in the housing; and an annular first air outlet; configuring a passage through which air, flowing in the housing by the blower fan, is discharged externally, and having an annular discharge end; a second air outlet, configuring a passage through which air, flowing in the housing by the blower fan, is discharged externally; and a flow path switching unit, provided in the housing, and guiding the air, discharged by the blower fan, to at least one of the first air outlet, and the second air outlet.

Advantageous Effects

According to an exemplary embodiment in the present disclosure, a fast flow rate and a large volume of air of discharged air may be secured.

According to an exemplary embodiment in the present disclosure, an entire area of a cylindrical filter may be used in a balanced manner, so a service lift of a cylindrical filter may be improved.

According to an exemplary embodiment in the present disclosure, an area of an air outlet is adjusted, so a flow rate and a discharge form of discharged air may be adjusted.

DESCRIPTION OF DRAWINGS

FIG. 1 is a front perspective view of an air purifier according to example 1;

FIG. 2 is a rear perspective view of an air purifier according to example 1;

FIG. 3 is a front view of an air purifier according to example 1;

FIG. 4 is a side view of an air purifier according to example 1;

FIG. 5 is a rear view of an air purifier according to example 1;

FIG. 6 is an exploded perspective view of an air purifier according to example 1;

FIG. 7 is a side cross-sectional view of an air purifier according to example 1;

FIG. 8 is a perspective view of a grill member included in an air purifier according to example 1;

FIG. 9 is a front perspective view of an air purifier according to example 2;

FIG. 10 is a front cross-sectional view illustrating an internal configuration of an air purifier according to example 3;

FIG. 11 is a perspective view of a driving unit included in an air purifier according to example 3;

FIG. 12 is a front view and a side cross-sectional view, end of an air purifier according to example 4 is completely open;

FIG. 13 is a front view and a side cross-sectional view, illustrating a discharge end in a state in which the discharge end of an air purifier according to example 4 is partially closed;

FIG. 14 is a drawing illustrating a state in which an adjusting unit, included in an air purifier according to example 4, is installed in a housing;

FIG. 15 is a perspective view of an operating state of an adjusting unit included in an air purifier according to example 4;

FIG. 16 is an exploded perspective view of an adjusting unit included in an air purifier according to example 4;

FIG. 17 is a drawing illustrating an operating state of a cover plate of an adjusting unit included in an air purifier according to example 4;

FIG. 18 is a drawing illustrating an operating state of a cover plate of an adjusting unit included in an air purifier according to example 4;

FIG. 19 is a front perspective view of an air purifier according to example 5;

FIG. 20 is a side cross-sectional view of a display unit included in an air purifier according to example 5;

FIG. 21 is a front perspective view of an air conditioner according to example 6;

FIG. 22 is a rear perspective view of an air conditioner according to example 6;

FIG. 23 is an exploded perspective view of an air conditioner according to example 6;

FIG. 24 is a side cross-sectional view of an air conditioner according to example 6;

FIGS. 25 to 27 are side cross-sectional views illustrating an operating state of a flow path switching unit included in an air conditioner according to example 6;

FIG. 28 is a front perspective view of an air conditioner according to example 7;

FIG. 29 is a front perspective view of an air conditioner according to example 8;

FIG. 30 is a side cross-sectional view of an air conditioner according to example 8;

FIG. 31 is a front view and a side cross-sectional view, illustrating a first air outlet of an air conditioner according to example 9 is completely open;

FIG. 32 is a front view and a side cross-sectional view, illustrating a first air outlet of an air conditioner according to example 9 is partially closed;

FIG. 33 is a drawing illustrating a state in which an adjusting unit, included in an air conditioner according to example 9, is installed in a housing;

FIG. 34 is a perspective view of an operating state of an adjusting unit included in an air conditioner according to example 9;

FIG. 35 is an exploded perspective view of an adjusting unit included in an air conditioner according to example 9;

FIGS. 36 and 37 are drawings illustrating an operating state of a cover plate of an adjusting unit included in an air conditioner according to example 9;

FIG. 38 is a front perspective view of an air conditioner according to example 10;

FIG. 39 is a rear perspective view of an air conditioner according to example 10;

FIG. 40 is a side view of an air conditioner according to example 10;

FIGS. 41 to 42 are cross-sectional views illustrating an operating state of a flow path switching unit included in an air conditioner according to example 10; and FIG. 43 is a perspective view illustrating a flow path switching unit included in an air conditioner according to example 10.

BEST MODE FOR INVENTION

The terminology used, herein is for the purpose of describing particular embodiments only and is not intended to be limiting of the invention. Furthermore, the singular expressions herein include plural expressions unless the context clearly indicates otherwise.

Hereinafter, preferred embodiments of the present invention will be described with reference to the accompanying drawings.

Example 1

First, with reference to FIGS. 1 to 8, example 1 will be described.

As illustrated in FIGS. 1 to 8, an air purifier 1100 according to an exemplary embodiment may include a housing 1110, a blower fan 1130, an annular discharge flow path 1140, a filter member 1150, and a grill member 1170.

The housing 1110 may form an external cover of the air purifier 1100 according to an exemplary embodiment, and may provide an internal space in which the blower fan 1130 and the filter member 1150 are able to be installed; and may be provided with the annular discharge flow path 1140 formed therein.

In an exemplary embodiment, the housing 1110 may be configured to include a front cover 1112 and a rear cover 1114, as illustrated in FIG. 6. Moreover, the front cover 1112 and the rear cover 1114 are attached to each other, thereby providing an internal space in which the blower fan 1130 and the filter member 1150 are able to be installed.

In addition, the housing 1110 may be provided with an air suction portion 1117 in which external air is sucked into an interior of the housing 1110. In an exemplary embodiment, the air suction portion 1117 may be provided in each of a front surface and a rear surface of the housing 1110, corresponding to a blower fan 1130 for sucking air in both directions, to be described later, but is not limited thereto.

In addition, in an exemplary embodiment, an outer surface of the housing 1110 may be provided with a pollution level sensor 1120 for measuring a pollution level of indoor air.

The blower fan 1130 is provided in the housing 1110. In this case, during an operation of the blower fan, the blower fan may generate air flow by allowing external air to be sucked into an interior of the housing 1110, to flow in the annular discharge flow path 1140, to be described later, and to be discharged externally again through a discharge end 1142.

The blower fan 1130, described above, may allow air to flow into the annular discharge flow path 1140 in at least one of upward, downward, and sideward directions of the annular discharge flow path 1140, to be described later.

In examples 1 to 5 illustrated, in FIGS. 1 to 20, a structure, in which a discharge side of the blower fan 1130 is disposed downwardly of the annular discharge flow path 1140 to allow air to flow in a lower end of the annular discharge flow path 1140, is disclosed, but is not limited thereto.

Meanwhile, in an exemplary embodiment, the blower fan 1130 may be configured as a centrifugal fan having high suction static pressure and airflow performance.

In this case, the blower fan 1130 may be a type of fan capable of sucking air in both directions, but is not limited thereto.

The annular discharge flow path 1140 is formed in the housing 1110, and may form a path in which air, flowing by the blower fan 1130 in the housing 1110, is discharged externally of the housing 1110.

The annular discharge flow path 1140, described above, may be formed to allow the annular discharge end 1142, that is, an end of a flow path, to be disposed in one surface of the housing 1110.

In an exemplary embodiment, the annular discharge flow path 1140 may be formed to be upwardly or downwardly inclined in a horizontal direction or toward a front of the housing 1100 in the housing 1110 to allow the discharge end 1142 to be disposed in a front surface of the housing 1100. Thus, the annular discharge flow path 1140 may be formed in a cylindrical shape, horizontally laid in the housing 1110, as a whole.

Here, the discharge end 1142 of the annular discharge flow path 1140 is disposed to be exposed to a front surface of the housing 1110, and serves as an air outlet for discharging air, in the housing 1110, to an interior. In this case, the discharge end is provided in an annular shape, according to a shape of an end of the annular discharge flow path 1140.

Meanwhile, the annular discharge flow path 1140, described above, is formed to have a cross section narrowing toward the discharge end 1142 in the housing 1110, as illustrated in at cross-sectional view of FIG. 7.

To form the annular discharge end 1142 described above, an air guide 1180 may be provided in the housing 1110 in an exemplary embodiment.

The air guide 1180 is extended into an interior of the housing 1110, thereby forming the annular discharge flow path 1140.

In detail, a discharge opening 1113, circularly open, may be formed in one surface of the housing 1110. Moreover, one end of the air guide 1180 is disposed in the center of the discharge opening 1113, and the other end thereof is extended into an interior of the housing 1110. Thus, an inner diameter of the annular discharge flow path 1140 may be formed.

In this case, an interval between an edge of one end of the air guide 1180 and the discharge opening 1113 may form the discharge end 1142 of the annular discharge flow path 1140.

In addition, a space between an outer side surface of the air guide 1180 and an inner wall of the housing 1110, or a space between an outer side surface of the air guide 1180 and the filter member 1150, to be described later, may form the annular discharge flow path 1140.

In addition, the air guide 1180 may be formed to have an outer diameter, increasing from the other end to one end, to allow a cross section of the annular discharge flow path 1140 to be narrower toward the discharge end 1142.

In addition, in an exemplary embodiment, the air guide 1180 may be extended from one surface to the other surface of the housing 1110, and may have a shape of a hollow horn.

In this case, an opening 1115, corresponding to a hollow portion of the other end of the air guide 1180, may be formed in the other surface of the housing 1110, and the other end of the air guide 1180 may be connected to an edge of the opening 1115.

Through the structure described above, a through hole 1182, passing from one surface to the other surface in the medium of the air guide 1180, may be formed in the housing 1110.

Meanwhile, the air guide 1180 is not limited to having a form in which an outer diameter increases from the other end to one end as described previously, but may be configured to have any form, as long as the annular discharge flow path 1140 has a cross section narrowing toward the discharge end 1142.

For example, the air guide 1180 may be formed to have a cylindrical shape with the same diameter at both ends, and a shape of an inner wall of the housing 1110 or the filter member 1150 may be formed to be narrower toward one end of the air guide 1180. Alternatively, the air guide 1180 may be formed to have an outer diameter narrowing from the other end to one end, and a shape of an inner wall of the housing 1110 or the filter member 1150 may be formed to be smaller by a larger amount of change as compared to an amount of change in an outer diameter of the air guide 1180 toward one end of the air guide 1180.

The filter member 1150 may be disposed in the annular discharge flow path 1140, thereby purifying air being in taken or flowing in the annular discharge flow path 1140.

The filter member 1150, described above, may be provided with various functional filters, capable of removing large dust particles, fine dust particles, viruses and odors, and the like, contained in air passing there through. In addition, the filter member 1150 may include a single filter having a single air purifying function, or may include a filter assembly, in which a plurality of filters, having various functions, respectively, overlap.

Meanwhile, in an exemplary embodiment, the filter member 1150 may have a cylindrical shape, surrounding a periphery of the air guide 1180.

Here, air, discharged from the blower fan 1130, passes through the filter member 1150 and then flows in the annular discharge flow path 1140, in a circumference of the filter member 1150.

In this case, if a sufficient gap between the filter member 1150 and the air guide 1180 is not secured, filter resistance increases, so air cannot smoothly pass through the filter member 1150. In an exemplary embodiment, the filter member 1150 is preferably configured to have an inner side surface spaced apart from an outer side surface of the air guide 1160 by a predetermined distance or more. Here, a separation distance between an inner side surface of the filter member 1150 and an outer side surface of the air guide 1180 may be set to various values, according to the design specifications of a device.

In addition, here, a gap between the filter member 1150 and the air guide 1180 may form the annular discharge flow path 1140.

Meanwhile, although not illustrated therein, in another exemplary embodiment, a filter member is disposed in an air intake side of the blower fan 1130, and thus may be configured to purify air, flowing in the blower fan 1130. The filter member, described above, does not have a cylindrical shape disposed in the annular discharge flow path 1140 as illustrated previously, but may have a flat plate shape disposed between the air suction portion 1117 and an air intake side of the blower fan 1130 in the housing 1110.

In another exemplary embodiment described above, a cylindrical filter member 1150 may be excluded from the annular discharge flow path 1140.

The grill member 1170 is provided in the discharge end 1142, and may guide air discharged from, the discharge end 1142.

In an exemplary embodiment, the grill member 1170 is provided at regular intervals in the annular discharge end 1142, and may be provided with a plurality of guide blades 1172, elongated in a discharge direction of discharged air.

The grill member 1170, described above, allows air flow of discharged air to have linearity or allows discharged air to flow spirally, through a shape of the plurality of guide blades 1172, thereby increasing a linear reaching distance of discharged air.

Alternatively, if the discharge end 1142 is simply annularly open without the grill member 1170, there may be a disadvantage in which air, discharged from the discharge end 1142, is diffused in a radial direction of the discharge end 1142.

The air purifier 1100 according to an exemplary embodiment as described previously may discharge air at a high rate of flow, since, as air, flowing along the annular discharge flow path 1140, flows toward the discharge end 1142, a flow rate of the air increases. For reference, Bernoulli's theorem shows that a flow rate increases, when air passes through a narrow cross section.

In addition, in the air purifier 1100 according to an exemplary embodiment, air, discharged at a high rate of flow in the discharge end 1142, generates a flow in air, present in the through hole 1182, and air, present in an outer edge of the discharge end 1142, so high airflow performance may be obtained.

In detail, the air, discharged from the discharge end 1142, has a relatively lower pressure than that of ambient air, that is, air inside the through hole 1182 and air at an outer edge of the discharge end 1142, due to a high rate of flow, so the air inside the through hole 1182 and the air at an outer edge of the discharge end 1142 may flow toward discharged air having a relatively low pressure.

Thus, the air purifier 1100 according to an exemplary embodiment may secure a high rate of flow and a large volume of air.

Example 2

FIG. 9 is a front perspective view of an air purifier 1100 according to example 2.

Referring to FIG. 9, an air purifier 1100 according to example 2 may have a housing 1110 configured in the form of a rectangular box, in a manner different from the air purifier 1100 according to example 1.

In other words, in the air purifier 1100 according to various exemplary embodiments, an outer cover of the housing 1110 is not limited to having a rounded shape, corresponding to the annular discharge end 1142. As illustrated in FIG. 9, while the discharge end 1142 is maintained, in an annular shape, the outer cover of the housing 1110 may be configured in various forms.

In addition, to configure a simple external cover of a device, the air suction portion 1117 may be excluded from a front surface of the housing 1110, and may be formed in a side surface of the housing 1110.

Example 3

Referring to FIGS. 10 and 11, an air purifier 1100 according to example 3 will be described.

Here, FIG. 10 is a front cross-sectional view illustrating an internal configuration of the air purifier 1100 according to example 3, and FIG. 11 is a perspective view of a driving unit 1160.

As illustrated in FIGS. 10 and 11, in an exemplary embodiment, the filter member 1150 is configured, to surround the annular discharge flow path 1140. Thus, a portion of the filter member in a circumferential direction is disposed between a discharge side of the blower fan 1130 and the annular discharge flow Path 1140, and the filter member may be configured to be rotated in a circumferential direction of the annular discharge flow path 1140.

In an exemplary embodiment, the blower fan 1130 blows air in one side of the annular discharge flow path 1140, so an air concentration section S, disposed between the blower fan 1130 and the annular discharge flow path 1140, may be generated in the filter member 1150.

Here, the air concentration section S is a portion of a circumference of the filter member 1150, disposed closest to the blower fan 1130, and is a portion through which a largest amount of air passes intensively, since air discharged from the blower fan 1130 passes through the filter member 1150 in a substantially linear form.

In the structure described above, when the blower fan 1130 is operated for a long period of time, air is only concentrated in a specific portion of the filter member 1150, so an amount of dust particles collected in an air concentrated portion is larger as compared to that in other portions. Thus, the service time of the filter member 1150 may become partially uneven, and air processing performance may be degraded.

To solve this, the air purifier 1100 according to example 3 may be configured to allow the air concentration section S to be periodically changed toy periodically rotating the filter member 1150, when the blower fan 1130 is operated.

To this end, in an exemplary embodiment, a driving unit 1160 for rotating the filter member 1150 in a circumferential direction may be provided in the housing 1110.

In an exemplary embodiment, as illustrated in FIG. 11, the driving unit 1160 may be configured to include an annular driven frame 1162 fastened to one end of the filter member 1150, and installed to be rotated in a circumferential direction in the housing 1110, and a filter drive member 1165 for rotating the driven frame 1162 in a circumferential direction.

For example, as illustrated in FIG. 11, a driven gear 1163 may be provided at an edge of the driven frame 1162, and the filter drive member 1165 may include a power transmission gear 1166 engaged with a gear of the driven frame 1162 as well as a motor member 1167 for rotating the power transmission gear 1166, but is not limited thereto.

Meanwhile, the air purifier 1100 according to example 3 is provided with a control unit (not shown) for controlling the filter drive member 1165, and the control unit may be operated to change the air concentration section S by periodically rotating the filter member 1150 based on the operating time of the blowing fan 1130, the operating speed, and the measured value of the pollution level sensor 1120.

Example 4

Referring to FIGS. 12 and 18, an air purifier 1100 according to example 4 will be described.

Here, FIG. 12 illustrates a state in which the discharge end 1142 of an air purifier 1100 according to example 4 is completely open, FIG. 13 illustrates a state in which the discharge end 1142 is partially closed, FIG. 14 illustrates a state in which an adjusting unit 1190 is installed in an inner periphery of the housing 1110, FIG. 15 illustrates a state in which, the adjusting unit 1190 is operated, FIG. 16 is an exploded perspective view of the adjusting unit 1190, as well as FIGS. 17 and 18 illustrate a state in which a cover plate 1192 of the adjusting unit 1130 is operated.

As illustrated in FIGS. 12 to 18, the air purifier 1100 according to example 4 may further include the adjusting unit 1190 for adjusting an opening area of the discharge end 1142 or shielding the discharge end 1142.

In an exemplary embodiment, the adjusting unit 1190 may be configured to adjust an outer diameter of the discharge end. 1142, In other words, the adjusting unit 1190 may be configured to adjust an opening area of the annular discharge end. 1142 by reducing or increasing an outer diameter of the discharge end 1142.

To implement the operation described above, in an exemplary embodiment, the adjusting unit 1190 may include a case 1191, a plurality of cover plates 1192, a rotating frame 1193, a fixing frame 1194, and a frame driving member 1195.

The case 1191 accommodates the plurality of cover plates 1192, the rotating frame 1193, the fixing frame 1194, and the frame driving member 1195, and thus may support the plurality of cover plates, the rotating frame, the fixing frame, and the frame driving member, on an interior of the housing 1110. A shape and structure of the case 1191, described above, are not particularly limited, and may be any shape and structure as long as the case is able to support the plurality of cover plates 1192, the rotating frame 1193, the fixing frame 1194, and the frame driving member 1195 on an interior of the housing 1110.

In an exemplary embodiment, a hole portion 1191a, opening having a diameter larger than that of the discharge end 1142 to allow an annular discharge flow path to be extended to the discharge opening 1113 formed in the front cover 1112, may be provided in the case 1191.

In addition, in an exemplary embodiment, a limit guide 1191b for limiting a moving distance of a limit, projection 1193b provided in the rotating frame 1193, to be described later, may be provided in the case 1191.

The plurality of cover plates 1192 are installed in the case 1191 and provided at an outer edge of the discharge end 1142, and may be configured to be moved in a radial direction of the discharge end 1142.

The plurality of cover plates 1192 cover a portion of the discharge end 1142 while moving in a radial direction of the discharge end 1142, thereby adjusting an outer diameter of the discharge end 1142.

In an exemplary embodiment, the plurality of cover plates 1192 are disposed at regular intervals along an outer edge of the discharge end 1142 to form an annulus as a whole.

To this end, in an exemplary embodiment, the cover plate 1192 may be provided, in a flat and curved bar shape, and the plurality of cover plates 1192 may be disposed so that portions thereof overlap each other as illustrated in FIG. 16.

In addition, the cover plate 1192 may be provided with a rotating shaft 1192a at an end of one side and may be provided with a guide projection 1192b at an end of the other side. Here, the rotating shaft 1192a may be provided in the form of a projection protruding from one surface of the cover plate 1192, while the guide projection 1192b may be provided in the form of a projection protruding from the other surface of the cover plate 1192.

In the configuration described above, the rotating shaft 1192a of the cover plate 1192 may be fastened to a shaft hole 1193a of the rotating frame 1193 to be rotated, and the guide projection 1192b of the cover plate 1192 may be fastened to be slid in a longitudinal direction of a guide groove 1194a to the guide groove 1194a of the fixing frame 1194.

The rotating frame 1193 may be configured to be annular, and may be provided to be rotated in a circumferential direction in the case 1191.

The rotating frame 1193, described above, is disposed in one surface of the plurality of cover plates 1192, and may allow the plurality of cover plates 1192 to be disposed at regular intervals along an outer edge of the discharge end 1142 and may support a cover plate so as to allow each cover plate 1192 to be rotated in a radial direction of the discharge end 1142.

In an exemplary embodiment, the rotating frame 1193 may be provided with the shaft hole 1193a to which the rotating shaft 1192a of the plurality of cover plates 1192 may be fastened.

In addition, in an exemplary embodiment, a frame gear for receiving rotational force of the frame driving member 1195 may be provided at an edge of the rotating frame 1193.

In addition, in an exemplary embodiment, the limit projection 1193b for limiting an angle of rotation of the may be provided at an edge of the rotating frame 1193. The limit projection 1193b is caught by both ends of the limit guide 1191b to limit an angle of rotation of the rotating frame 1193, so the rotating frame 1193 may be only rotated within a range of the limit guide 1191b.

The fixing frame 1194 is disposed in the other surface of the plurality of cover plates 1132, and may allow the plurality of cover plates 1192 to be rotated around respective rotating shafts 1192a according to rotation of the rotating frame 1193.

To this end, the guide groove 1194a into which the guide projection 1192b of the cover plate 1192 is inserted, to be slid may be formed in the fixing frame 1194. The guide groove 1194a may be formed as a long groove elongated in a radial direction of the fixing frame 1194.

In the configuration described above, when the rotating frame 1193 is rotated, a position of the plurality of cover plates 1192, fastened to the rotating frame 1193 through the rotating shaft 1192a, may be moved in a direction of rotation of the rotating frame 1193.

In this case, the guide projection 1192b of the plurality of cover plates 1192 is fastened to the guide groove 1194a of the fixing frame 1194. Thus, to compensate for a change in distance between the shaft hole 1193a, to which the rotating shaft 1192a is fastened, and the guide groove 1194a, to which the guide projection 1192b is fastened, due to rotation of the rotating frame 1193, the plurality of cover plates 1192 may be able to rotate in a radial direction of the discharge end 1142 while maintaining a state in which the guide projection 1192b is fastened to the guide groove 1194a.

Here, when the plurality of cover plates 1192 are rotated in a radial direction of the discharge end 1142, an outer diameter of the discharge end 1142 may be adjusted according to a diameter of a circular opening formed by an inner edge of the plurality of cover plates 1192.

For example, when the rotating frame 1193 rotates in one direction, the plurality of cover plates 1192 are disposed as illustrated in FIG. 17, so an outer diameter of the discharge end 1142 may be increased. When the rotating frame 1193 rotates in the other direction, the plurality of cover plates 1192 are disposed as illustrated in FIG. 18, so an outer diameter of the discharge end 1142 may be reduced.

In an exemplary embodiment, the plurality of cover plates 1192 are configured to adjust a diameter of a circular opening formed by an inner edge to be less than or equal to an inner diameter of the discharge end. 1142, thereby airtightly sealing the discharge end 1142.

Meanwhile, the frame driving member 1195 is provided in the case 1191, and rotates the rotating frame 1193 so as to adjust an angle of rotation of the rotating frame 1193.

For example, the frame driving member 1195 may be configured to include the rotary gear 1195a engaged with a frame gear 1193c of the rotating frame 1193, and a stepping motor 1195b for rotating the rotary gear 1195a, but is not limited thereto. In addition, the frame driving member may include any mechanical element capable of rotating the rotating frame 1193.

Meanwhile, the air purifier 1100 according to example 4, as described previously, adjusts an opening area of the discharge end 1142 through the adjusting unit 1190, thereby changing flow characteristics of discharged air.

In detail, when, a portion of the discharge end 1142 is closed as illustrated in FIG. 13, a narrower flow path may be formed, as compared, to when the discharge end 1142 is completely open as illustrated in FIG. 12. Thus, a flow rate of discharged air may be relatively increased.

Moreover, when a portion of the discharge end 1142 is closed as illustrated in FIG. 13, an air discharge shape may be narrowed, as compared to when the discharge end 1142 is completely open as illustrated in FIG. 12. Thus, it is more effective when air is blown far away in a narrow range.

Example 5

Referring to FIGS. 19 and 20, an air purifier 1100 according to example 5 will be described. FIG. 19 is a front perspective view of an air purifier 1100 according to example 5, and FIG. 20 is a side cross-sectional view illustrating a display unit 1200 included in the air purifier 1100 according to example 5.

As illustrated in FIGS. 19 to 20, the air purifier 1100 according to example 5 may further include a display unit 1200 provided to cover a hollow portion of the air guide 1180, and displaying an operating state of the air purifier 1100 or having a control button.

In other words, in the air purifier 1100 according to example 5, a circular display unit 1200 covering the through hole 1182, instead of the through hole 1182, may be provided in the housing 1110, in a manner different from, the air purifier 1100 according to examples 1 to 4, illustrated in FIGS. 1 to 18.

In the air purifier 1100 according to example 5, described above, the through hole 1182, formed as an empty space, is used as a display and a control panel, so a simple outer cover of a product is formed without separately providing a display and a control button in the housing 1110. Thus, aesthetic design sensibility of a device may be improved.

Meanwhile, the examples 1 to 5 are separately described as different examples in the above description, but the air purifier 1100 may be implemented as a form in which at least one of the examples 1 to 5, described previously, is merged.

Example 6

First, with reference to FIGS. 21 to 27, an example 6 will be described.

As illustrated in FIGS. 21 to 27, an air conditioner 2100 according to an exemplary embodiment may include a housing 2110, a blower fan 2130, a guide frame 2140, an air processing unit 2150, a first air outlet 2165, a second air outlet 2175, and a flow path switching unit 2180.

The housing 2110 may form an external cover of the air conditioner 2100 according to an exemplary embodiment, and may provide an internal space in which the blower fan 2130, the guide frame 2140, the air processing unit 2150, and the flow path switching unit 2180 are able to be installed.

In an exemplary embodiment, the housing 2110 may be configured to include a front cover 2112 and a rear cover 2114, as illustrated in FIG. 23, Moreover, the front cover 2112 and the rear cover 2114 are attached, to each other, thereby providing an internal space in which the blower fan 2130, the guide frame 2140, the air processing unit 2150, and the flow path switching unit 2160 are able to be installed.

In addition, the housing 2110 may be provided with an air suction portion 2117 in which external air is sucked into an interior of the housing 2110.

In an exemplary embodiment, the air suction portion 2117 may be provided in the rear surface of the housing 2110, but is not limited thereto.

In addition, in an exemplary embodiment, an outer surface of the housing 2110 may be additionally provided with a pollution level sensor 2120 for measuring a pollution level of indoor air.

The blower fan 2130 is provided in the housing 2110. In this case, during an operation of the blower fan, the blower fan may generate air flow by allowing external air to be sucked into an interior of the housing 2110, to pass through the air processing unit 2150, to be described later, and to be discharged externally again through the first air outlet 2165 and the second air outlet 2175.

In an exemplary embodiment, the blower fan 2130 is disposed below the annular discharge flow path 2160 and the second air outlet 2175, and may discharge air upwardly. In an example 6, the blower fan 2130 may be disposed directly below an annular discharge flow path 2160, to be described later, as illustrated in FIG. 24. In this case, the air processing unit 2150, to be described later, may be disposed directly below the second air outlet 2175, but is not limited thereto.

Meanwhile, in an exemplary embodiment, the blower fan 2130 may be configured as a centrifugal fan having high suction static pressure and airflow performance.

In this case, the blower fan 2130 may be a dual suction type fan, capable of sucking air in both directions, or may be a single suction type fan capable of sucking air in one direction.

The guide frame 2140, in the form of a partition wall, may be provided in the housing 2110, and may guide air, discharged from the blower fan 2130, to the first air outlet 2165 and the second air outlet 2175.

In an exemplary embodiment, the guide frame 2140 may include a scroll portion 2141 surrounding a periphery of the blower fan 2130, and a dividing portion 2144 provided in an upper end of the scroll portion 2141 and dividing the annular discharge flow path 2160 and the second air outlet 2175.

Here, the scroll portion 2141 is configured to surround a periphery of the blower fan 2130, and thus may guide air, discharged, in a circumferential direction of the blower fan 2130.

In addition, a vent 2142, in which air, guided by the scroll portion 2141, is blown in a direction of the dividing portion 2144, may be provided in an upper end of the scroll portion 2141.

In addition, an air inlet 2143, in which air flows into the blower fan 2130, may be provided in one surface of the scroll portion 2141, and a fan motor 2135 for rotating the blower fan 2130 may be provided in the center of the air inlet 2143, but is not limited thereto.

In addition, the dividing portion 2144 may be provided with a partition frame 2145 for dividing a space in which, the annular discharge flow path 2160, to be described later, is formed in an internal, space of the housing 2110.

In addition, in an exemplary embodiment, the partition frame 2145 may be provided with a through opening 2146 in which an air guide 2167, to be described later, passes therethrough and is coupled thereto.

In addition, the partition frame 2145 may be provided with an enclosure 2147, formed in a periphery of the through opening 2146, protruding from one surface of the partition frame 2145, and forming the annular discharge flow path 2160, to be described later.

The enclosure 2147 may be provided in the form surrounding a remaining area, excluding an air inflow end 2161 of the annular discharge flow path 2160, of a periphery of the through opening 2146, and may allow the annular discharge flow path 2160 to be formed in an internal space surrounded thereby.

The air processing unit 2150 is provided in the housing 2110, and may have at least one function of air purification, dehumidification, and humidification.

For example, the air processing unit 2150 may include an air purification filter with various functions such as dust particle collection, deodorization, virus removal, and the like, in the case of having an air purification function, may include a dehumidification filter or a heat exchanger, in the case of having a dehumidification function, and may include a humidification filter, a ultrasonic humidification unit, or a heating humidification unit, in the case of having a humidification function.

In addition, the air processing unit 2150 may include an air purification filter together with a humidification filter, or an air purification filter together with a heat exchanger, thereby having a plurality of functions among an air purification function, a dehumidification function, and a humidification function.

Thus, an air processing device according to an exemplary embodiment, according to the air processing unit 2150 adopted thereby, may be implemented as a product such as an air purifier, a dehumidifier, a humidifier, a dehumidifying purifier, a humidifying purifier, and the like.

In an exemplary embodiment, the air processing unit 2150 is disposed in an air intake side of the blower fan 2130, and may process air, sucked into the blower fan 2130.

For example, the air processing unit 2150 may be disposed between, the air inlet 2143 formed in the scroll portion 2141 of the guide frame 2140 and the air suction portion 2117 of the housing 2110, but is not limited thereto.

The first air outlet 2165 may form a passage in which air inside the housing 2110, flowing by the blower fan 2130, is discharged externally. The first air outlet 2165, described above, may be provided in an annular shape, and an annular discharge end from which air is discharged may be formed in an end thereof.

In an exemplary embodiment, the first air outlet 2165 may be formed in one surface of the housing 2110.

To form the first air outlet 2165, in an exemplary embodiment, the annular discharge flow path 2160 may be formed in the housing 2110.

The annular discharge flow path 2160 may be formed in the housing 2110 to allow an end of a discharge side, from which air is discharged, to form the first air outlet 2165, and to allow the first air outlet 2165 to be disposed in one surface of the housing 2110.

In an exemplary embodiment, the annular discharge flow path 2160 may be formed to be upwardly or downwardly inclined in a horizontal direction or toward a front of the housing 2110 in the housing 1110 to allow the first air outlet 2165 to be disposed in a front cover 2112 of the housing 1110. Thus, the annular discharge flow path 2160 may be formed in a cylindrical shape, horizontally or obliquely laid in the housing 2110, as a whole.

Here, the first air outlet 2165 may be provided in an annular shape in the front cover 2112 of the housing 2110 according to a shape of an end of the annular discharge flow path 2160.

Meanwhile, the annular discharge flow path 2160, described above, may be formed to have a cross section narrowing toward the first air outlet 2165 in the housing 2110, as illustrated in a cross-sectional view of FIG. 24.

To this end, in an exemplary embodiment, an air guide 2167 may be provided in the housing 2110.

The air guide 2167 is extended into an interior of the housing 2110, thereby forming the annular discharge flow path 2160.

In detail, a discharge opening 2113, circularly open, may be formed in one surface of the housing 2110. Moreover, one end of the air guide 2167 is disposed in the center of the discharge opening 2113, and the other end thereof is extended into an interior of the housing 2110. Thus, an inner diameter of the annular discharge flow path 2160 may be formed.

In this case, an interval between an edge of one end of the air guide 2167 and the discharge opening 2113 may form the first air outlet 2165 of the annular discharge flow path 2160.

In addition, a space between an outer side surface of the air guide 2167 and the enclosure 2147 provided in the dividing portion 2144 of the guide frame 2140 may form, the annular discharge flow path 2160.

In addition; in an exemplary embodiment, the air guide 2167 may be installed to pass through the through opening 2146 formed in the partition frame 2145 of the dividing portion 2144 of the guide frame 2140.

In this case, the annular discharge flow path 2160 may be provided as a space surrounded by the air guide 2167, the enclosure 2147, and the partition frame 2145.

In addition, in an exemplary embodiment, the air inflow end 2161 in communication with the vent 2142 of the scroll portion 2141 may be provided in a lower end of the annular discharge flow path 2160.

In one configuration described above, air, discharged from the vent 2142 of the scroll portion 2141, flows into the annular discharge flow path 2160 through the air inflow end 2161, and is then discharged externally through the first air outlet 2165.

In addition, to provide a form in which a cross section of the annular discharge flow path 2160 becomes narrower toward the first air outlet 2165, as an example, the air guide 2167 may be configured so that an outer diameter increases from the other end to one end.

However, it is not limited thereto, and the air guide 2167 may be configured to have any shape as long as the annular discharge flow path 2160 is formed to allow a cross section thereof to become narrower toward the first air outlet 2165.

For example, the air guide 2167 may be formed to have a cylindrical shape with the same diameter at both ends, and a shape of the enclosure 2147 may be formed to be narrower toward the first air outlet 2165. Alternatively, the air guide 2167 may be formed to have an outer diameter narrowing toward the first air outlet 2165, and a shape of the enclosure 2147 may be formed to be smaller by an amount of change larger than an amount of change in an outer diameter of the air guide 2167 toward the first, air outlet 2165.

Meanwhile, in an exemplary embodiment, the air guide 2167 may be extended from, one surface to the other surface of the housing 2110, and may have a shape of a hollow horn.

In this case, an opening 2115, corresponding to a hollow portion of the other end of the air guide 2167, may be formed in the other surface of the housing 2110, and the other end of the air guide 2167 may be connected to an edge of the opening 2115.

Through the structure described above, a through hole 2168, passing from one surface to the other surface in the medium of the air guide 2167, may be formed in the housing 2110.

In a structure of the annular discharge flow path 2160, in which a cross section becomes narrower toward the first air outlet 2165, as air flows toward the first air outlet 2165, a flow rate of air, flowing along the annular discharge flow path 2160, increases. Thus, the air is discharged from the first air outlet 2165 at a high rate of flow. For reference, Bernoulli's theorem shows that a flow rate increases, when air passes through a narrow cross section.

In addition, air, discharged at a high rate of flow in the first air outlet 2165, generates a flow in air, present in the through hole 2168, and air, present in an outer edge of the first air outlet 2165, so a volume of air, discharged from the first air outlet 2165, may be increased.

In detail, the air, discharged from the first air outlet 2165, has a relatively lower pressure than that of ambient air, that is, air inside the through hole 2168 and air at an outer edge of the first air outlet 2165, due to a high rate of flow, so the air inside the through hole 2168 and the air at an outer edge of the first air outlet 2165 may flow toward discharged air having a relatively low pressure.

The second air outlet 2175 may form a passage in which air inside the housing 2110, flowed by the blower fan 2130, is discharged externally.

In an exemplary embodiment, the second air outlet 2175 is formed in an upper end of the housing 2110, and may form a path in which air, discharged upwardly from the blower fan 2130, flows almost linearly, and is then discharged to an upper end of the housing 2110.

The flow path switching unit 2160 may be provided in the housing 2110, and may guide air, discharged from the blower fan 2130, to at least one of the first air outlet 2165 and the second air outlet 2175. In other words, the flow path switching unit 2180 switches a flow path of air in the housing 2110, thereby allowing air to be discharged to the first air outlet 2165 or the second air outlet 2175, or to be discharged to the first air outlet 2165 and the second air outlet 2175 at the same time.

The flow path switching unit 2180, described above, may be configured to open and close the air inflow end 2161 of the annular discharge flow path 2160 and the second air outlet 2175.

In an exemplary embodiment, the flow path switching unit 2180 may include an opening and closing door 2182 and a motor member 2186.

Here, the opening and closing door 2182 is provided to be rotated in the housing 2110, and may rotate to selectively open and close the air inflow end 2161 of the annular discharge flow path 2160 and the second air outlet 2175.

In an exemplary embodiment, the opening and closing door 2182 may be configured in the form of a curved plate provided at a branch point of the air inflow end 2161 of the annular discharge flow path 2160 and a flow path toward the second air outlet 2175, as illustrated in FIGS. 24 to 27.

In addition, the motor member 2186 is coupled to a rotating shaft 2222 of the opening and closing door 2182, and thus may adjust an angle of rotation of the opening and closing door 2182.

In the configuration described above, when the opening and closing door 2182 shields the air inflow end 2161 of the annular discharge flow path 2160 as illustrated in FIG. 25, air, blown from the blower fan 2130, may be only discharged to the second air outlet 2175.

Moreover, when the opening and closing door 2182 allows the air inflow end 2161 of the annular discharge flow path 2160 to be open and shields the flow path toward the second air outlet 2175, as illustrated in FIG. 26, air, blown from the blower fan 2130, may flow in the annular discharge flow path 2160 and may be only discharged to the first air outlet 2165.

Moreover, when the opening and closing door 2182 allows the air inflow end 2161 of the annular discharge flow path 2160 and the flow path toward the second air outlet 2175 to be open, as illustrated in FIG. 27, a portion of air, blown from the blower fan 2130, may be discharged to the first air outlet 2175, and a remaining portion thereof may be discharged to the second air outlet 2175.

The air conditioner 2100 according to example 6, as described previously, has the advantage of having fast flow performance and high airflow performance of discharged, air through the annular first air outlet 2165, in which a cross section of a flow path becomes narrower.

In addition, the air conditioner 2100 according to example 6 is configured to selectively open at least one of the first air outlet 2165 and the second air outlet 2175 through the flow path switching unit 2180. In this case, when a concentration of air flow is required for a narrow range, air is discharged to the first air cutlet 2165. When overall indoor air circulation is required, air is discharged to the second air outlet 2175. Thus, there is an advantage that various types of blowing air flow can be generated as needed, using a single blower fan 2130.

Example 7

Next, referring to FIG. 28, an air conditioner 2100 according to example 7 will be described. Here, FIG. 28 is a front perspective view of the air conditioner 2100 according to example 7.

As illustrated in FIG. 28, the air conditioner 2100 according to example 7 may include a grill member 2190 for guiding discharged air to the first air outlet 2165.

In an exemplary embodiment, the grill member 2130 is provided at regular intervals in the annular first air outlet 2165, and may be provided with a plurality of guide blades 2186, elongated in a discharge direction of discharged air.

The grill member 2190, described above, allows air flow of discharged air to have linearity or allows discharged air to flow spirally, through a shape of the plurality of guide blades 2186, thereby increasing a linear reaching distance of discharged air.

Alternatively, when the first air outlet 2165 is simply and annularly open without the grill member 2190, air, discharged from the first air outlet 2165, is diffused in a radial direction of the first air outlet 2165, so there is a disadvantage in that a linear reaching distance of discharged air is short.

Meanwhile, the grill member 2190 may be configured to be attached to and detached from the front cover 2112 to be able to be separated from the housing 2110 and to be easily cleaned. The grill member 2190, described above, may be integrally configured, with the air guide 2167, and may be configured to be separated from the air guide 2167 so as to be independently separated, from, the air guide 2167 in the housing 2110.

Meanwhile, when the grill member 2190 and the air guide 2167 are integrally configured, an assembly in which the grill member 2190 and the air guide 2167 are attached is separated from the housing 2110, the blower fan 2130 may be exposed through the first air outlet 2165 and the air inflow end 2161.

As described above, the structure, in which the blower fan 2130 is exposed, may allow a foreign object to flow to the blower fan 2130 through the first air outlet 2165 and the air inflow end 2161, and there is a risk of a safety accident in which the user's hand may enter to the blower fan 2130. Thus, in an exemplary embodiment, the flow path switching unit 2180 may be operated to automatically shield the first, air outlet 2165 when the grill member 2190 and the air guide 2167 are separated from the housing 2110.

In other words, the flow path switching unit 2180 may be operated to allow the opening and closing door 2182 to close the air inflow end 2161, when the grill member 2190 and the air guide 2167 are separated from the housing 2110.

To this end, the housing 2110 may be provided with a mounting detection sensor (not shown) for sensing whether the grill member 2190 or the air guide 2167 is mounted, and the motor member 2186 of the flow path switching unit 2180 may receive a signal of the mounting detection sensor and allow the opening and closing door 2182 to be rotated so as to close the air inflow end 2161, when the grill member 2190 or the air guide 2167 is separated from the housing 2110.

Example 8

Next, referring to FIGS. 29 and 30, an air conditioner 2100 according to example 8 will be described. Here, FIGS. 29 and 30 are a front perspective view and a side cross-sectional view of the air conditioner 2100 according to example 8. As illustrated in FIGS. 29 to 30, the air conditioner 2100 according to example 8 may further include a display unit 2300 provided to cover a hollow portion of the air guide 2167, and displaying an operating state of the air conditioner 2100 or having a control button.

In other words, in the air conditioner 2100 according to example 8, a circular display unit 2300 covering the through hole 2168, instead of the through hole 2168, may be provided in the housing 2110, in a manner different from the air conditioner 2100 according to example 6 illustrated in FIGS. 21 to 27.

In the air conditioner 2100 according to example 8, described above, the through hole 2168, formed as an empty space, is used as a display and a control panel, so a simple outer cover of a product is formed without providing a separate display and a separate control button in the housing 2110. Thus, aesthetic design sensibility of a device may be improved.

Meanwhile, in FIGS. 29 and 30, the display unit 2300 is illustrated to cover the entirety of the through hole 2168, but is not limited thereto. The display unit 2300 is configured in the form in which an outer edge thereof is spaced apart from an inner wall of the air guide 2167, and thus may be configured to form an air flow gap between the outer edge of the display unit 2300 and an inner side surface of the air guide 2167.

Example 9

Next, referring to FIGS. 31 and 37, an air conditioner 2100 according to example 9 will be described.

Here, FIG. 31 is a front view and a side cross-sectional view illustrating a state in which the first air outlet 2165 of the air conditioner 2100 according to example 3 is completely open, and FIG. 32 is a front view and a side cross-sectional view illustrating a state in which a portion of the first air outlet 2165 is closed. In addition, FIG. 33 illustrates a state in which an adjusting unit 2200 is installed in the housing 2110, and FIG. 34 illustrates a state in which the adjusting unit 2200 is operated. In addition, FIG. 35 is an exploded perspective view of the adjusting unit 2200, while FIGS. 36 and 37 are views illustrating a state in which a cover plate 2220, provided in the adjusting unit 2200, is operated.

As illustrated in FIGS. 31 to 37, the air conditioner 2100 according to example 9 may further include the adjusting unit 2200 for adjusting an opening area of the first air outlet 2165 or shielding the first air outlet 2165.

In an exemplary embodiment, the adjusting unit 2200 may be configured to adjust an outer diameter of the first air outlet 2165. In other words, the adjusting unit 2200 may be configured to adjust an opening area of the annular first air outlet 2165 by reducing or increasing an outer diameter of the first air outlet 2165.

To implement the operation described above, in an exemplary embodiment, the adjusting unit 2200 may include a case 2210, a plurality of cover plates 2220, a rotating frame 2230, a fixing frame 2240, and a frame driving member 2250.

The case 2210 accommodates the plurality of cover plates 2220, the rotating frame 2230, the fixing frame 2240, and the frame driving member 2250, and thus may support the plurality of cover plates, the rotating frame, the fixing frame, and the frame driving member, on an interior of the housing 2110. A shape and structure of the case 2210, described above, are not particularly limited, and may be any shape and structure as long as the case is able to support, the plurality of cover plates 2220, the rotating frame 2230, the fixing frame 2240, and the frame driving member 2250 on an interior of the housing 2110.

In an exemplary embodiment, a hole portion 2212, opening having a diameter larger than that of the first air outlet 2165 to allow an annular discharge flow path to be extended to the discharge opening 2113 formed in the front cover 2112, may be provided in the case 2210.

In addition, in an exemplary embodiment, a limit guide 2214 for limiting a moving distance of a limit projection 2234 provided in the rotating frame 2230, to be described later, may be provided in the case 2210.

The plurality of cover plates 2220 are installed in the case 2210 and provided at an outer edge of the first air outlet 2165, and may be configured to be moved in a radial direction of the first air outlet 2165.

The plurality of cover plates 2220 cover a portion of the first air outlet 2165 while moving in a radial direction of the first air outlet 2165, thereby adjusting an outer diameter of the first air outlet 2165.

In an exemplary embodiment, the plurality of cover plates 2220 are disposed at regular intervals along an outer edge of the first air outlet 2165 to form an arm alias as a whole.

To this end, in an exemplary embodiment, the cover plate 2220 may be provided in a flat and curved bar shape, and the plurality of cover plates 2220 may be disposed so that some of the plurality of cover plates overlap each other as illustrated in FIG. 35.

In addition, the cover plate 2220 may be provided with a rotating shaft 2222 at an end of one side and may be provided with a guide projection 2224 at an end of the other side. Here, the rotating shaft 2222 may be provided in the form of a projection protruding from one surface of the cover plate 2220, while the guide projection 2224 may be provided in the form of a projection protruding from the other surface of the cover plate 2220.

In the configuration described above, the rotating shaft 2222 of the cover plate 2220 may be fastened to a shaft hole 2232 of the rotating frame 2230 to be rotated, and the guide projection 2224 of the cover plate 2220 may be fastened to be slid in a longitudinal direction of a guide groove 2242 to the guide groove 2242 of the fixing frame 2240.

The rotating frame 2230 may be configured to be annular, and may be provided to be rotated in a circumferential direction in the case 2210.

The rotating frame 2230, described above, is disposed in one surface of the plurality of cover plates 2220, and may allow the plurality of cover plates 2220 to be disposed at regular intervals along an outer edge of the first air outlet 2165 and may support a cover plate so as to allow each cover plate 2220 to be rotated in a radial direction of the first air outlet 2165.

In an exemplary embodiment, the rotating frame 2230 may be provided with the shaft hole 2232 to which the rotating shaft 2222 of the plurality of cover plates 2220 may be fastened.

In addition, in an exemplary embodiment, a frame gear 2236 for receiving a rotational force of the frame driving member 2250 may be provided at an edge of the rotating frame 2230.

In addition, in an exemplary embodiment, the limit projection 2234 for limiting an angle of rotation of the rotating frame 2230 by the limit guide 2214 of the case 2210 may be provided at an edge of the rotating frame 2230. The limit projection 2234 is caught by both ends of the limit guide 2214 to limit an angle of rotation of the rotating frame 2230, so the rotating frame 2230 may be only rotated, within a range of the limit guide 2214.

The fixing frame 2240 is disposed in the other surface of the plurality of cover plates 2220, and may allow the plurality of cover plates 2220 to be rotated around respective rotating shafts 2222 according to rotation of the rotating frame 2230.

To this end, the guide groove 2242 into which the guide projection 2224 of the cover plate 2220 is inserted to be slid, may be formed in the fixing frame 2240. The guide groove 2242 may be formed as a long groove elongated in a radial direction of the fixing frame 2240.

In the configuration described above, when the rotating frame 2230 is rotated, a position of the plurality of cover plates 2220, fastened, to the rotating frame 2230 through the rotating shaft 2222, may be moved, in a direction of rotation, of the rotating frame 2230.

In this case, the guide projection 2224 of the plurality of cover plates 2220 is fastened to the guide groove 2242 of the fixing frame 2240. Thus, to compensate for a change in distance between the shaft hole 2232, to which the rotating shaft 2222 is fastened, and the guide groove 2242, to which the guide projection 2224 is fastened, due to rotation of the rotating frame 2230, the plurality of cover plates 2220 may be able to rotate in a radial direction of the first, air outlet 2165 while maintaining a state in which the guide projection 2224 is fastened to the guide groove 2242.

Here, when the plurality of cover plates 2220 are rotated in a radial direction of the first air outlet 2165, an outer diameter of the first air outlet 2165 may be adjusted according to a diameter of a circular opening formed by an inner edge of the plurality of cover plates 2220.

For example, when the rotating frame 2230 rotates in one direction, the plurality of cover plates 2220 are disposed as illustrated in FIG. 36, so an outer diameter of the first air outlet 2165 may be increased. When the rotating frame 2230 rotates in the other direction, the plurality of cover plates 2220 are disposed as illustrated in FIG. 37, so an outer diameter of the first air outlet 2165 may be reduced.

In an exemplary embodiment, the plurality of cover plates 2220 are configured to adjust a diameter of a circular opening formed by an inner edge to be less than or equal to an inner diameter of the first air outlet 2165, thereby airtightly sealing the first air outlet 2165.

Meanwhile, the frame driving member 2250 is provided in the case 2210, and rotates the rotating frame 2230 so as to adjust an angle of rotation of the rotating frame 2230.

For example, the frame driving member 2250 may be configured to include the rotary gear 2252 engaged with a frame gear 2236 of the rotating frame 2230, and a stepping motor 2254 for rotating the rotary gear 2252, but is not limited thereto. In addition, the frame driving member may include any mechanical element, capable of rotating the rotating frame 2230.

Meanwhile, the air conditioner 2100 according to example 9, as described previously, adjusts an opening area of the first air outlet 2165 through the adjusting unit 2200, thereby changing flow characteristics of discharged air.

In detail, when a portion, of the first air outlet 2165 is closed as illustrated in FIG. 32, a narrower flow path may be formed, as compared to when the first air outlet 2165 is completely open as illustrated, in FIG. 31. Thus, a flow rate of discharged air may be relatively increased.

Moreover, when a portion, of the first air outlet 2165 is closed as illustrated in FIG. 32, an air discharge shape may be narrowed, as compared to when the first air outlet 2165 is completely open, as illustrated, in FIG. 31. Thus, it is more effective when air is blown far way in a narrow range.

Example 10

Finally, with reference to FIGS. 38 to 39, an air conditioner 2100 according to example 10 will be described.

Here, FIG. 38 is a front perspective view of an air conditioner 2100 according to example 10, FIG. 39 is a rear perspective view of the air conditioner 2100, FIG. 40 is a side view of the air conditioner 2100, FIGS. 41 and 42 are side cross-sectional views illustrating a state in which the flow path switching unit 2180 is operated, and FIG. 43 is a perspective view of the flow path switching unit 2180.

First, as illustrated in FIGS. 38 to 42, in the air conditioner 2100 according to example 10, the blower fan 2130 may be disposed directly below the second air outlet 2175, and the air processing unit 2150 may be disposed in front of the blower fan 2130.

Here, the air suction portion 2117 may be provided in a front surface of the housing 2110.

In the configuration described above, a flow path of air, flowing from the blower fan 2130 to the second air outlet 2175, may be formed in a nearly linear form, and a flow path of air, flowing from the blower fan 2130 to the first air outlet 2165, may be provided in an inclined or bent form.

In the air conditioner 2100 according to example 10, a flow path of air, discharged to the second air outlet 2175, is almost linear. Thus, the air conditioner according to example 10 has the advantage that air at higher pressure is able to be discharged from the second air outlet 2175, as compared to the air conditioner 2100 according to example 6, described previously with reference to FIGS. 21 to 27. As discharge wind pressure of the second air outlet 2175 becomes higher, indoor air circulation performance is improved.

In addition, in the air conditioner 2100 according to example 10, to secure a high wind pressure of the second air outlet 2175 while maintaining a structure of a through hole 2168 formed in the housing 2110, the housing 2110 may be configured to allow the second air outlet 2175 to be located below the through hole 2168, in a manner different from the form of the housing 2110 of the air conditioner 2100 according to example 6.

In other words, the rear cover 2114 of the housing 2110 may include an extension casing portion 2118, extended upwardly from an upper front portion of the second air outlet 2175 in an upper end and accommodating the air guide 2157 therein, and having the annular discharge flow path 2160 formed therein, as illustrated, in FIGS. 38 to 40.

Here, the extension casing portion 2118 may form a portion of a rear surface of the housing 2110, and the through hole 2168 may be formed in the medium of the air guide 2167 in the extension casing portion 2118 of a front cover 2112 and a rear cover 2114.

In addition, regarding a structure of the housing 2110 of the air conditioner 2100 according to example 10, as compared to a structure of the housing 2110 of the air conditioner 2100 according to example 6, a length of an air flow path, connected from, a discharge side of the blower fan 2130 to the second air outlet 2175, is short, so there may be an advantage in that pressure loss of air, discharged from the second air outlet 2175, is less.

For reference, in the air conditioner 2100 according to example 6, pressure loss due to a long flow distance to air, flowing in a flow path between a discharge side of the blower fan 2130, formed in the housing 2110, and the second air outlet 2175, may occur in air.

Meanwhile, in an example 10, the opening and closing door 2182 of the flow path switching unit 2180 may be provided to have a flat plate shape having a rotating shaft 2222 in one end, as illustrated in FIGS. 41 to 43.

The opening and closing door 2182, described above, has a rotating shaft 2222 between the air inflow end 2161 of the annular discharge flow path 2160 and the second air outlet 2175. Moreover, while the opening and closing door rotates, the opening and closing door is able to shield the air inflow end 2161 of the annular discharge flow path 2160 or to shield the second air outlet 2175.

Meanwhile, the opening and closing door 2182 having a flat plate shape, described above, may be shaken due to a pressure of air, blown from the blower fan 2130, and thus may generate a noise, in a case in which the opening and closing door is disposed to shield the air inflow end 2161 of the annular discharge flow path 2160 and the second air outlet 2175.

In detail, as in an example 10, in a structure in which the second air outlet 2175 is located directly above the blower fan 2130, the opening and closing door 2182, disposed to cover the second, air outlet 2175, is resistant to air, blown from the blower fan 2130, while having a planar form, thereby receiving a significant amount of air pressure.

Thus, when the opening and closing door 2182 is disposed to shield the air inflow end 2161 and the second, air outlet 2175, a structure for fixing the opening and closing door 2182 so as not to be shaken may be required.

To this end, in an exemplary embodiment, the opening and closing door 2182 may have a magnet 2184 in a body thereof, and a magnetic body (for example, iron (Fe)), receiving a suction force caused by magnetic force of the magnet 2184 provided on the opening and closing door 2132, may be provided in the air inflow end 2161 of the annular discharge flow path 2160 and the second air outlet 2175.

In the configuration described above, the opening and closing door 2182 is adsorbed by a magnetic body through suction force caused by magnetic force of the magnet 2184 when being disposed to cover the air inflow end 2161 and the second air outlet 2175. In this case, even when the opening and closing door receives pressure of air, the opening and closing door may be fixed without a fluctuation.

For example, a magnetic body, provided in the air inflow end 2161 of the annular discharge flow path 2160, may be coupled to a frame in the housing 2110, forming the air inflow end 2161, and a magnetic body, provided, in the second air outlet 2175, may be provided as an iron perforated net member 2177 mounted to cover the second air outlet 2175.

The perforated net member 2177 is mounted to cover the second air outlet 2175, thereby allowing air to pass while preventing a foreign object from flowing into the second air outlet 2175.

Meanwhile, the examples 6 to 10 are separately described as different examples in the above description, but the air conditioner 2100 may be implemented in a form in which at least one of the examples 6 to 10, described previously, is merged.

While the present disclosure has been shown and described with reference to exemplary embodiments thereof in particular, the present disclosure is not limited thereto. It will be readily apparent to those skilled in the art that various changes and modifications thereof may be made within the spirit and scope of the present disclosure, and therefore to be understood that such changes and modifications belong to the scope of the appended claims.

The invention claimed is:

1. An air purifier, comprising:
a housing defining a circular discharge opening formed in one surface of the housing;
a blower fan provided in the housing;
an air guide disposed within a center of the discharge opening and extending into an interior of the housing such that the air guide extends from the one surface of the housing to another surface of the housing; and
a filter member having a cylindrical shape surrounding a periphery of the air guide, the filter member including an inner side surface spaced apart from an outside surface of the air guide;
wherein the housing and the air guide define an annular discharge flow path through which air, inside of the housing and flowing by the blower fan, is discharged externally, the filter member being disposed within the annular discharge flow path, the annular discharge flow path having an annular discharge end defined by the one surface of the housing, the annular discharge flow path further having a cross section that narrows from the interior of the housing to the annular discharge end, and
wherein the housing defines an opening formed within the other surface such that the opening and a hollow portion of the air guide form a through hole extending from the one surface of the housing to the other surface of the housing through the air guide.

2. The air purifier of claim 1, wherein the air guide has an outer diameter increasing toward the discharge opening in the housing.

3. The air purifier of claim 1, wherein the air guide has a shape of a hollow horn.

4. An air conditioner, comprising:
a housing defining a circular discharge opening formed in one surface of the housing;
a blower fan provided in the housing;
an air guide disposed within a center of the discharge opening and extending into an interior of the housing such that the air guide extends from the one surface of the housing to another surface of the housing; and
a flow path switching unit provided within the housing,
wherein the one surface of the housing defines an annular first air outlet forming a passage through which air, flowing within the housing by the blower fan, is discharged externally, wherein the housing defines a second air outlet forming a passage through which air, flowing in within in the housing by the blower fan, is discharged externally, wherein the housing and the air guide define an annular discharge flow path having an annular discharge end corresponding to the first air outlet, wherein the flow path switching unit is configured to guide the air discharged by the blower fan to at least one of the first air outlet and the second air outlet, and wherein the housing defines an opening formed within the other surface such that the opening and a hollow portion of the air guide form a through hole extending from the one surface of the housing to the other surface of the housing through the air guide.

5. The air conditioner of claim 4, wherein the second air outlet is defined by an upper end of the housing.

6. The air conditioner of claim 4, wherein the flow path switching unit is configured to open and close an air inflow end of the annular discharge flow path and the second air outlet.

7. The air conditioner of claim 6, wherein the flow path switching unit includes:
   an opening and closing door configured to be rotated in the housing and rotated to selectively open and close the air inflow end of the annular discharge flow path and the second air outlet, and
   a motor member for rotating the opening and closing door.

8. The air conditioner of claim 7, wherein:
   the opening and closing door has a flat plate shape having a rotating shaft in one end and has a body provided with magnet, and
   the second air outlet and the air inflow end of the annular discharge flow path are provided with a magnetic body for receiving a suction force caused by magnetic force of the magnet.

9. The air conditioner of claim 8, wherein the second air outlet is provided with a perforated net member including a magnetic body.

10. The air conditioner of claim 6, wherein the blower fan is disposed below the annular discharge flow path and the second air outlet and discharges air upwardly.

11. The air conditioner of claim 10, wherein the blower fan is disposed directly below the second air outlet.

12. The air conditioner of claim 6, wherein the annular discharge flow path has a cross section narrowing from an interior of the housing to the first air outlet.

13. The air conditioner of claim 1, wherein the air guide has an outer diameter increasing toward the discharge opening in the housing.

14. The air conditioner of claim 13, wherein the air guide has a shape of a hollow horn.

15. The air purifier of claim 1, wherein the blower fan is configured to blow the air into the annular discharge flow path.

16. The air purifier of claim 1, wherein the filter member is rotatable in a circumferential direction of the annular discharge flow path.

17. The air purifier of claim 16, wherein:
   the filter member is provided with an air concentration section disposed between a discharge side of the blower fan and the annular discharge flow path, and
   when the blower fan is operated, the filter member rotates periodically such that the air concentration section is periodically changed.

18. The air purifier of claim 16, further comprising:
   a driving unit configured to rotating the filter member in the circumferential direction, the driving unit including an annular driven frame fastened to one end of the filter member and a filter drive member configured to rotating the driven frame in the circumferential direction.

19. The air purifier of claim 1, further comprising:
   a filter member disposed within an air intake side of the blower fan, the filter member configured to purify air flowing into the blower fan.

20. The air purifier of claim 1, further comprising:
   a grill member provided in the discharge end, the grill member configured to guide discharged air.

* * * * *